US012626851B2

(12) United States Patent
Dube et al.

(10) Patent No.: US 12,626,851 B2
(45) Date of Patent: May 12, 2026

(54) HIGH FREQUENCY INTEGRATED PLANAR MAGNETICS FOR A BIDIRECTIONAL AC TO DC CLLC RESONANT CONVERTER

(71) Applicant: The Research Foundation for The State University of New York, Binghamton, NY (US)

(72) Inventors: Sunil Dube, Vestal, NY (US); Kalyan Yenduri, Vestal, NY (US); Pritam Das, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 851 days.

(21) Appl. No.: 17/810,579

(22) Filed: Jul. 1, 2022

(65) Prior Publication Data

US 2023/0005653 A1      Jan. 5, 2023

Related U.S. Application Data

(60) Provisional application No. 63/203,015, filed on Jul. 4, 2021.

(51) Int. Cl.
| | |
|---|---|
| *H01F 27/24* | (2006.01) |
| *H01F 27/28* | (2006.01) |
| *H02M 7/68* | (2006.01) |

(52) U.S. Cl.
CPC ............. *H01F 27/24* (2013.01); *H01F 27/28* (2013.01); *H02M 7/68* (2013.01)

(58) Field of Classification Search
CPC .......... H01F 27/24; H01F 27/28; H01F 27/38; H01F 27/40; H01F 2027/2809; H01F 2027/2819; H01F 27/2804; H01F 3/14; H02M 7/68; H02M 3/003; H02M 7/4807; H02M 1/0064; H02M 7/003
See application file for complete search history.

(56) References Cited

U.S. PATENT DOCUMENTS

| | | | |
|---|---|---|---|
| 4,571,667 | A | 2/1986 | Csorsz |
| 4,769,754 | A | 9/1988 | Reynolds |
| 4,774,649 | A | 9/1988 | Archer |
| 4,805,081 | A | 2/1989 | Chambers |
| 4,864,479 | A | 9/1989 | Steigerwald |
| 4,916,362 | A | 4/1990 | Orenstein |

(Continued)

FOREIGN PATENT DOCUMENTS

| | | |
|---|---|---|
| FR | 3019933 A1 | 10/2015 |

*Primary Examiner* — Mang Tin Bik Lian
(74) *Attorney, Agent, or Firm* — Hoffberg & Associates; Steven Hoffberg

(57) ABSTRACT

A transformer for a power converter, comprising: a first auxiliary subcore, a central subcore, and a second auxiliary subcore, each respective subcore comprising a lower plate, at least one pair of central spacers, and an upper plate, the lower plate, at least one pair of central spacers, and the upper plate of each subcore, being respectively separated by a gap; the first auxiliary subcore and the central subcore being separated by a gap; the second auxiliary subcore and the central subcore being separated by a gap; a primary coil, encircling a first spacer of the first auxiliary subcore and a first spacer of the central subcore; and a secondary coil, encircling a second spacer of the second auxiliary subcore and a second spacer of the central subcore.

20 Claims, 11 Drawing Sheets

(56) References Cited

U.S. PATENT DOCUMENTS

| | | | |
|---|---|---|---|
| 4,959,764 A | 9/1990 | Bassett |
| 4,980,611 A | 12/1990 | Orenstein |
| 4,982,147 A | 1/1991 | Lauw |
| 4,994,684 A | 2/1991 | Lauw |
| 5,028,804 A | 7/1991 | Lauw |
| 5,066,900 A | 11/1991 | Bassett |
| 5,073,849 A | 12/1991 | Morris |
| 5,126,931 A | 6/1992 | Jitaru |
| 5,131,376 A | 7/1992 | Ward |
| 5,157,319 A | 10/1992 | Klontz |
| 5,157,593 A | 10/1992 | Jain |
| 5,177,675 A | 1/1993 | Archer |
| 5,207,208 A | 5/1993 | Ward |
| 5,208,738 A | 5/1993 | Jain |
| 5,235,501 A | 8/1993 | Stuart |
| 5,239,251 A | 8/1993 | Lauw |
| 5,249,113 A | 9/1993 | Perol |
| 5,267,133 A | 11/1993 | Motomura |
| 5,293,308 A | 3/1994 | Boys |
| 5,301,096 A | 4/1994 | Klontz |
| 5,325,283 A | 6/1994 | Farrington |
| 5,341,083 A | 8/1994 | Klontz |
| 5,341,280 A | 8/1994 | Divan |
| 5,349,514 A | 9/1994 | Ushiki |
| 5,396,410 A | 3/1995 | Okochi |
| 5,409,163 A | 4/1995 | Erickson |
| 5,434,768 A | 7/1995 | Jitaru |
| 5,450,305 A | 9/1995 | Boys |
| 5,453,923 A | 9/1995 | Scalais |
| 5,485,362 A | 1/1996 | Archer |
| 5,540,384 A | 7/1996 | Erickson |
| 5,561,349 A | 10/1996 | Hartai |
| 5,568,017 A | 10/1996 | Albou |
| 5,582,348 A | 12/1996 | Erickson |
| 5,608,771 A | 3/1997 | Steigerwald |
| 5,644,184 A | 7/1997 | Kucherov |
| 5,680,301 A | 10/1997 | Oughton, Jr. |
| 5,694,304 A | 12/1997 | Telefus |
| 5,712,771 A | 1/1998 | Fitter |
| 5,712,772 A | 1/1998 | Telefus |
| 5,737,203 A | 4/1998 | Barrett |
| 5,748,013 A | 5/1998 | Beauclair |
| 5,859,771 A | 1/1999 | Kniegl |
| 5,886,516 A | 3/1999 | Barrett |
| 5,990,776 A | 11/1999 | Jitaru |
| 6,018,468 A | 1/2000 | Archer |
| 6,032,076 A | 2/2000 | Melvin |
| 6,100,663 A | 8/2000 | Boys |
| 6,108,216 A | 8/2000 | Abe |
| 6,111,368 A | 8/2000 | Luchaco |
| 6,124,581 A | 9/2000 | Ulrich |
| 6,154,111 A | 11/2000 | Rehm |
| 6,181,077 B1 | 1/2001 | Greenland |
| 6,181,079 B1 | 1/2001 | Chang |
| 6,211,498 B1 | 4/2001 | Patridge |
| 6,272,025 B1 | 8/2001 | Riggio |
| 6,288,378 B1 | 9/2001 | Patridge |
| 6,301,128 B1 | 10/2001 | Jang |
| 6,304,460 B1 | 10/2001 | Cuk |
| 6,316,881 B1 | 11/2001 | Shannon |
| 6,317,337 B1 | 11/2001 | Yasumura |
| 6,320,765 B2 | 11/2001 | Yasumura |
| 6,323,627 B1 | 11/2001 | Schmiederer |
| 6,343,021 B1 | 1/2002 | Williamson |
| 6,366,474 B1 | 4/2002 | Gucyski |
| 6,370,043 B1 | 4/2002 | Yasumura |
| 6,376,993 B1 | 4/2002 | Romanczuk |
| 6,388,896 B1 | 5/2002 | Cuk |
| 6,400,579 B2 | 6/2002 | Cuk |
| 6,462,962 B1 | 10/2002 | Cuk |
| 6,469,469 B1 | 10/2002 | Chambers |
| 6,493,242 B1 | 12/2002 | Riggio |
| 6,504,423 B2 | 1/2003 | Riggio |
| 6,507,501 B2 | 1/2003 | Riggio |
| 6,529,363 B2 | 3/2003 | Waffenschmidt |
| 6,563,096 B1 | 5/2003 | Pacholok |
| 6,567,281 B2 | 5/2003 | Riggio |
| 6,633,138 B2 | 10/2003 | Shannon |
| 6,670,590 B1 | 12/2003 | Pacholok |
| 6,683,286 B2 | 1/2004 | Ulrich |
| RE38,547 E | 7/2004 | Hartai |
| 6,911,848 B2 | 6/2005 | Vinciarelli |
| 6,930,893 B2 | 8/2005 | Vinciarelli |
| 6,934,165 B2 | 8/2005 | Adler |
| 6,934,166 B2 | 8/2005 | Vinciarelli |
| 6,952,355 B2 | 10/2005 | Riggio |
| 6,975,098 B2 | 12/2005 | Vinciarelli |
| 6,980,074 B1 | 12/2005 | Jitaru |
| 6,984,965 B2 | 1/2006 | Vinciarelli |
| 7,034,264 B2 | 4/2006 | Kagan |
| 7,095,629 B2 | 8/2006 | Yasumura |
| 7,136,293 B2 | 11/2006 | Petkov |
| 7,145,786 B2 | 12/2006 | Vinciarelli |
| 7,151,963 B2 | 12/2006 | Havel |
| 7,158,389 B2 | 1/2007 | Yasumura |
| 7,170,761 B2 | 1/2007 | Yasumura |
| 7,174,208 B2 | 2/2007 | Degroot |
| 7,187,263 B2 | 3/2007 | Vinciarelli |
| 7,193,868 B2 | 3/2007 | Yasumura |
| 7,200,434 B2 | 4/2007 | Havel |
| 7,209,369 B1 | 4/2007 | Yasumura |
| 7,242,595 B2 | 7/2007 | Yasumura |
| 7,269,873 B2 | 9/2007 | Brewer |
| 7,279,665 B2 | 10/2007 | Kagan |
| 7,285,875 B2 | 10/2007 | Yasumura |
| 7,301,785 B2 | 11/2007 | Yasumura |
| 7,323,964 B1 | 1/2008 | Shyu |
| 7,339,801 B2 | 3/2008 | Yasumura |
| 7,342,475 B2 | 3/2008 | Weger |
| 7,352,596 B2 | 4/2008 | Cheng |
| 7,388,760 B2 | 6/2008 | Yasumura |
| 7,388,762 B2 | 6/2008 | Yasumura |
| 7,423,887 B2 | 9/2008 | Yasumura |
| 7,447,048 B2 | 11/2008 | Yasumura |
| 7,448,109 B2 | 11/2008 | Brewer |
| 7,652,231 B2 | 1/2010 | Kagan |
| 7,656,686 B2 | 2/2010 | Yasumura |
| 7,741,734 B2 | 6/2010 | Joannopoulos |
| 7,742,318 B2 | 6/2010 | Fu |
| 7,746,669 B2 | 6/2010 | Falk |
| 7,760,517 B2 | 7/2010 | Herty |
| 7,767,941 B2 | 8/2010 | Kagan |
| 7,778,046 B1 | 8/2010 | Cuk |
| 7,817,452 B2 | 10/2010 | Smith |
| 7,821,799 B2 | 10/2010 | Jacobs |
| 7,825,543 B2 | 11/2010 | Karalis |
| 7,839,255 B2 * | 11/2010 | Nagano ............... H01F 27/38 |
| | | 336/181 |
| 7,843,708 B2 | 11/2010 | Seong |
| 7,876,067 B2 | 1/2011 | Greenfeld |
| 7,889,477 B2 | 2/2011 | Neubarth |
| 7,915,874 B1 | 3/2011 | Cuk |
| 7,948,208 B2 | 5/2011 | Partovi |
| 7,952,322 B2 | 5/2011 | Partovi |
| 8,022,576 B2 | 9/2011 | Joannopoulos |
| 8,031,042 B2 | 10/2011 | Silva |
| 8,035,255 B2 | 10/2011 | Kurs |
| 8,076,800 B2 | 12/2011 | Joannopoulos |
| 8,076,801 B2 | 12/2011 | Karalis |
| 8,084,889 B2 | 12/2011 | Joannopoulos |
| 8,097,983 B2 | 1/2012 | Karalis |
| 8,106,539 B2 | 1/2012 | Schatz |
| 8,120,457 B2 | 2/2012 | Hu |
| 8,134,351 B2 | 3/2012 | Cuk |
| 8,169,185 B2 | 5/2012 | Partovi |
| 8,222,827 B2 | 7/2012 | Kuennen |
| 8,304,935 B2 | 11/2012 | Karalis |
| 8,314,375 B2 | 11/2012 | Arditi |
| 8,324,759 B2 | 12/2012 | Karalis |
| 8,339,812 B2 | 12/2012 | Martini |
| 8,339,817 B2 | 12/2012 | Halberstadt |
| 8,350,538 B2 | 1/2013 | Cuk |
| 8,350,540 B2 | 1/2013 | Cuk |
| 8,362,651 B2 | 1/2013 | Hamam |

(56)  References Cited

U.S. PATENT DOCUMENTS

| | | | |
|---|---|---|---|
| 8,363,427 | B2 | 1/2013 | Anguelov |
| 8,391,031 | B2 | 3/2013 | Garrity |
| 8,395,282 | B2 | 3/2013 | Joannopoulos |
| 8,395,283 | B2 | 3/2013 | Joannopoulos |
| 8,400,017 | B2 | 3/2013 | Kurs |
| 8,400,018 | B2 | 3/2013 | Joannopoulos |
| 8,400,019 | B2 | 3/2013 | Joannopoulos |
| 8,400,020 | B2 | 3/2013 | Joannopoulos |
| 8,400,021 | B2 | 3/2013 | Joannopoulos |
| 8,400,022 | B2 | 3/2013 | Joannopoulos |
| 8,400,023 | B2 | 3/2013 | Joannopoulos |
| 8,400,024 | B2 | 3/2013 | Joannopoulos |
| 8,406,017 | B2 | 3/2013 | Hu |
| 8,410,636 | B2 | 4/2013 | Kurs |
| 8,441,154 | B2 | 5/2013 | Karalis |
| 8,446,744 | B2 | 5/2013 | Scheel |
| 8,461,719 | B2 | 6/2013 | Kesler |
| 8,461,720 | B2 | 6/2013 | Kurs |
| 8,461,721 | B2 | 6/2013 | Karalis |
| 8,461,722 | B2 | 6/2013 | Kurs |
| 8,466,583 | B2 | 6/2013 | Karalis |
| 8,471,410 | B2 | 6/2013 | Karalis |
| 8,476,788 | B2 | 7/2013 | Karalis |
| 8,482,158 | B2 | 7/2013 | Kurs |
| 8,487,480 | B1 | 7/2013 | Kesler |
| 8,497,601 | B2 | 7/2013 | Hall |
| 8,502,634 | B2 | 8/2013 | Gruber |
| 8,520,409 | B2 | 8/2013 | Harrison |
| 8,546,906 | B2 | 10/2013 | Tipton, IV |
| 8,552,592 | B2 | 10/2013 | Schatz |
| 8,569,914 | B2 | 10/2013 | Karalis |
| 8,587,153 | B2 | 11/2013 | Schatz |
| 8,587,155 | B2 | 11/2013 | Giler |
| 8,598,743 | B2 | 12/2013 | Hall |
| 8,614,901 | B2 | 12/2013 | Victor |
| 8,618,696 | B2 | 12/2013 | Kurs |
| 8,618,749 | B2 | 12/2013 | Kuennen |
| 8,629,578 | B2 | 1/2014 | Kurs |
| 8,629,652 | B2 | 1/2014 | Partovi |
| 8,629,654 | B2 | 1/2014 | Partovi |
| 8,643,326 | B2 | 2/2014 | Campanella |
| 8,648,686 | B2 | 2/2014 | Tsai |
| 8,667,452 | B2 | 3/2014 | Verghese |
| 8,669,676 | B2 | 3/2014 | Karalis |
| 8,674,551 | B2 | 3/2014 | Low |
| 8,686,333 | B2 | 4/2014 | Arditi |
| 8,686,598 | B2 | 4/2014 | Schatz |
| 8,692,410 | B2 | 4/2014 | Schatz |
| 8,692,412 | B2 | 4/2014 | Fiorello |
| 8,693,213 | B2 | 4/2014 | Jungreis |
| 8,705,252 | B2 | 4/2014 | Duvnjak |
| 8,716,903 | B2 | 5/2014 | Kurs |
| 8,723,366 | B2 | 5/2014 | Fiorello |
| 8,729,737 | B2 | 5/2014 | Schatz |
| 8,760,007 | B2 | 6/2014 | Joannopoulos |
| 8,760,008 | B2 | 6/2014 | Joannopoulos |
| 8,766,485 | B2 | 7/2014 | Joannopoulos |
| 8,772,971 | B2 | 7/2014 | Joannopoulos |
| 8,772,972 | B2 | 7/2014 | Joannopoulos |
| 8,772,973 | B2 | 7/2014 | Kurs |
| 8,773,231 | B2 | 7/2014 | Jacobson |
| 8,791,599 | B2 | 7/2014 | Joannopoulos |
| RE45,069 | E | 8/2014 | Falk |
| 8,796,945 | B2 | 8/2014 | Zhai |
| 8,805,530 | B2 | 8/2014 | John |
| 8,811,039 | B2 | 8/2014 | The Ngo |
| 8,836,172 | B2 | 9/2014 | Hamam |
| 8,847,548 | B2 | 9/2014 | Kesler |
| 8,847,719 | B2 | 9/2014 | Melanson |
| 8,860,241 | B2 | 10/2014 | Hadar |
| 8,875,086 | B2 | 10/2014 | Verghese |
| 8,890,470 | B2 | 11/2014 | Partovi |
| 8,896,264 | B2 | 11/2014 | Partovi |
| 8,901,778 | B2 | 12/2014 | Kesler |
| 8,901,779 | B2 | 12/2014 | Kesler |
| 8,901,881 | B2 | 12/2014 | Partovi |
| 8,907,531 | B2 | 12/2014 | Hall |
| 8,912,687 | B2 | 12/2014 | Kesler |
| 8,922,066 | B2 | 12/2014 | Kesler |
| 8,923,017 | B2 | 12/2014 | Young |
| 8,928,276 | B2 | 1/2015 | Kesler |
| 8,933,594 | B2 | 1/2015 | Kurs |
| 8,934,269 | B2 | 1/2015 | Garrity |
| 8,937,408 | B2 | 1/2015 | Ganem |
| 8,946,938 | B2 | 2/2015 | Kesler |
| 8,947,047 | B2 | 2/2015 | Partovi |
| 8,947,186 | B2 | 2/2015 | Kurs |
| 8,957,549 | B2 | 2/2015 | Kesler |
| 8,963,488 | B2 | 2/2015 | Campanella |
| 8,964,419 | B2 | 2/2015 | Ryoo |
| 9,035,499 | B2 | 5/2015 | Kesler |
| 9,036,372 | B2 | 5/2015 | Worek |
| 9,065,286 | B2 | 6/2015 | Joannopoulos |
| 9,065,343 | B2 | 6/2015 | Hu |
| 9,065,423 | B2 | 6/2015 | Ganem |
| 9,084,335 | B2 | 7/2015 | Mekonnen |
| 9,093,853 | B2 | 7/2015 | Schatz |
| 9,095,729 | B2 | 8/2015 | John |
| 9,101,777 | B2 | 8/2015 | John |
| 9,105,393 | B2 * | 8/2015 | Takahashi ............... H01F 27/08 |
| 9,105,959 | B2 | 8/2015 | Kesler |
| 9,106,083 | B2 | 8/2015 | Partovi |
| 9,106,203 | B2 | 8/2015 | Kesler |
| 9,112,362 | B2 | 8/2015 | Partovi |
| 9,112,363 | B2 | 8/2015 | Partovi |
| 9,112,364 | B2 | 8/2015 | Partovi |
| 9,123,467 | B2 | 9/2015 | Wu |
| 9,124,183 | B2 | 9/2015 | Oldenkamp |
| 9,142,965 | B2 | 9/2015 | Grana |
| 9,143,044 | B2 | 9/2015 | Ye |
| 9,160,203 | B2 | 10/2015 | Fiorello |
| 9,178,369 | B2 | 11/2015 | Partovi |
| 9,184,595 | B2 | 11/2015 | Kurs |
| 9,184,662 | B2 | 11/2015 | Nishino |
| 9,190,911 | B2 | 11/2015 | Dai |
| 9,203,365 | B1 | 12/2015 | Milbert |
| 9,210,751 | B2 | 12/2015 | Reed |
| 9,219,407 | B2 | 12/2015 | Harrison |
| 9,240,270 | B2 | 1/2016 | Wu |
| 9,246,336 | B2 | 1/2016 | Kurs |
| 9,269,489 | B2 | 2/2016 | Wu |
| 9,276,437 | B2 | 3/2016 | Partovi |
| 9,287,607 | B2 | 3/2016 | Efe |
| 9,287,788 | B2 | 3/2016 | Harrison |
| 9,299,493 | B2 | 3/2016 | Kuennen |
| 9,306,635 | B2 | 4/2016 | Kurs |
| 9,318,257 | B2 | 4/2016 | Lou |
| 9,318,898 | B2 | 4/2016 | John |
| 9,318,922 | B2 | 4/2016 | Hall |
| 9,318,945 | B2 | 4/2016 | Worek |
| 9,343,922 | B2 | 5/2016 | McCauley |
| 9,349,523 | B2 | 5/2016 | Jacobson |
| 9,356,659 | B2 | 5/2016 | Partovi |
| 9,368,965 | B2 | 6/2016 | Arditi |
| 9,369,182 | B2 | 6/2016 | Kurs |
| 9,384,885 | B2 | 7/2016 | Karalis |
| 9,396,867 | B2 | 7/2016 | Kurs |
| 9,397,524 | B2 | 7/2016 | Kuennen |
| 9,401,439 | B2 | 7/2016 | Arditi |
| 9,404,954 | B2 | 8/2016 | Roy |
| 9,406,419 | B2 | 8/2016 | Njiende T. |
| 9,413,255 | B2 | 8/2016 | Ohashi |
| 9,414,462 | B1 | 8/2016 | Chung |
| 9,421,388 | B2 | 8/2016 | John |
| 9,425,622 | B2 | 8/2016 | Deboy |
| 9,431,825 | B2 | 8/2016 | Arditi |
| 9,442,172 | B2 | 9/2016 | Verghese |
| 9,444,265 | B2 | 9/2016 | Karalis |
| 9,444,520 | B2 | 9/2016 | Hall |
| 9,449,757 | B2 | 9/2016 | John |
| 9,450,421 | B2 | 9/2016 | Joannopoulos |
| 9,450,422 | B2 | 9/2016 | Karalis |
| 9,461,479 | B2 | 10/2016 | Chae |
| 9,461,501 | B2 | 10/2016 | Partovi |

(56) References Cited

U.S. PATENT DOCUMENTS

| | | | |
|---|---|---|---|
| 9,465,064 B2 | 10/2016 | Roy |
| 9,494,631 B2 | 11/2016 | Davila |
| 9,496,719 B2 | 11/2016 | Kesler |
| 9,496,732 B2 | 11/2016 | Partovi |
| 9,502,921 B2 | 11/2016 | Bucher |
| 9,509,147 B2 | 11/2016 | Karalis |
| 9,509,223 B2 | 11/2016 | Hunter |
| 9,514,875 B2 | 12/2016 | Worek |
| 9,515,494 B2 | 12/2016 | Kurs |
| 9,515,495 B2 | 12/2016 | Kurs |
| 9,515,562 B2 | 12/2016 | Dai |
| 9,525,364 B2 | 12/2016 | Garrity |
| 9,525,376 B2 | 12/2016 | Box |
| 9,537,403 B2 | 1/2017 | Zhang |
| 9,543,455 B2 | 1/2017 | Arditi |
| 9,544,683 B2 | 1/2017 | Ganem |
| 9,544,956 B2 | 1/2017 | Chen |
| 9,554,431 B2 | 1/2017 | Garrity |
| 9,559,602 B2 | 1/2017 | Deboy |
| 9,577,436 B2 | 2/2017 | Kesler |
| 9,577,440 B2 | 2/2017 | Partovi |
| 9,583,255 B2 | 2/2017 | Fornage |
| 9,584,036 B2 | 2/2017 | Garrity |
| 9,584,189 B2 | 2/2017 | Kurs |
| 9,590,456 B2 | 3/2017 | Kuennen |
| 9,595,378 B2 | 3/2017 | Jonas |
| 9,596,005 B2 | 3/2017 | Kurs |
| 9,601,261 B2 | 3/2017 | Schatz |
| 9,601,266 B2 | 3/2017 | Karalis |
| 9,602,025 B2 | 3/2017 | Deboy |
| 9,602,168 B2 | 3/2017 | Lamenza |
| 9,608,530 B2 | 3/2017 | Mueller |
| 9,662,161 B2 | 5/2017 | Ganem |
| 9,698,607 B2 | 7/2017 | Kesler |
| 9,705,409 B2 | 7/2017 | Yamaoka |
| 9,711,991 B2 | 7/2017 | Hall |
| 9,712,045 B2 | 7/2017 | Mao |
| 9,722,447 B2 | 8/2017 | Partovi |
| 9,742,204 B2 | 8/2017 | Kurs |
| 9,744,858 B2 | 8/2017 | Hall |
| 9,748,039 B2 | 8/2017 | Kurs |
| 9,754,718 B2 | 9/2017 | Hall |
| 9,761,370 B2 | 9/2017 | Wu |
| 9,780,573 B2 | 10/2017 | McCauley |
| 9,780,605 B2 | 10/2017 | Kurs |
| 9,786,423 B2 | 10/2017 | Avestruz |
| 9,787,141 B2 | 10/2017 | Karalis |
| 9,787,204 B2 | 10/2017 | Ohashi |
| 9,789,777 B2 | 10/2017 | Mi |
| 9,789,778 B2 | 10/2017 | Czainski |
| 9,793,721 B2 | 10/2017 | Partovi |
| 9,806,541 B2 | 10/2017 | Schatz |
| 9,831,682 B2 | 11/2017 | Hamam |
| 9,831,722 B2 | 11/2017 | Joannopoulos |
| 9,837,846 B2 | 12/2017 | Partovi |
| 9,837,860 B2 | 12/2017 | McCarthy |
| 9,842,684 B2 | 12/2017 | John |
| 9,842,687 B2 | 12/2017 | Kurs |
| 9,842,688 B2 | 12/2017 | Kurs |
| 9,843,217 B2 | 12/2017 | Atasoy |
| 9,843,228 B2 | 12/2017 | Kurs |
| 9,843,230 B2 | 12/2017 | John |
| 9,847,166 B2 | 12/2017 | Kneller |
| 9,847,646 B2 | 12/2017 | Grana |
| 9,853,568 B2 | 1/2018 | Harada |
| 9,855,620 B2 | 1/2018 | Kooken |
| 9,857,821 B2 | 1/2018 | Kurs |
| 9,876,434 B2 | 1/2018 | Torrico-Bascopé |
| 9,891,023 B2 | 2/2018 | Compton |
| 9,892,849 B2 | 2/2018 | Kurs |
| 9,897,411 B2 | 2/2018 | Compton |
| 9,906,147 B2 | 2/2018 | Ye |
| 9,919,610 B1 | 3/2018 | Sarwat |
| 9,921,028 B2 | 3/2018 | Compton |
| 9,929,721 B2 | 3/2018 | Karnstedt |
| 9,931,951 B2 | 4/2018 | Khaligh |
| 9,933,805 B2 | 4/2018 | Liu |
| 9,941,045 B2 | 4/2018 | Pollock |
| 9,943,697 B2 | 4/2018 | John |
| 9,948,145 B2 | 4/2018 | Sealy |
| 9,952,266 B2 | 4/2018 | Katz |
| 9,954,375 B2 | 4/2018 | McCauley |
| 9,956,639 B2 | 5/2018 | Kooken |
| 9,959,972 B2 | 5/2018 | Lestoquoy |
| 9,973,158 B1 | 5/2018 | Mendenhall |
| 9,979,273 B2 | 5/2018 | Suryanarayana |
| 9,991,843 B2 | 6/2018 | Alon |
| 10,003,267 B1 | 6/2018 | Zhao |
| 10,003,275 B2 | 6/2018 | Chen |
| 10,008,858 B2 | 6/2018 | Garrity |
| 10,014,722 B2 | 7/2018 | Kuennen |
| 10,018,744 B2 | 7/2018 | Roy |
| 10,027,184 B2 | 7/2018 | Verghese |
| 10,060,705 B2 | 8/2018 | Compton |
| 10,063,077 B2 | 8/2018 | Solodovnik |
| 10,063,104 B2 | 8/2018 | Kurs |
| 10,063,110 B2 | 8/2018 | Meichle |
| 10,074,474 B2 | 9/2018 | Harrison |
| 10,075,019 B2 | 9/2018 | Buenrostro |
| 10,075,028 B2 | 9/2018 | Wu |
| 10,075,086 B2 | 9/2018 | Madawala |
| 10,079,557 B2 | 9/2018 | Zimmanck |
| 10,083,791 B2 | 9/2018 | Njiende T. |
| 10,084,348 B2 | 9/2018 | Kesler |
| 10,097,011 B2 | 10/2018 | Kesler |
| 10,097,044 B2 | 10/2018 | Karalis |
| 10,115,520 B2 | 10/2018 | Partovi |
| 10,135,348 B2 | 11/2018 | Hsiao |
| 10,141,770 B2 | 11/2018 | Partovi |
| 10,141,788 B2 | 11/2018 | Karnstedt |
| 10,141,790 B2 | 11/2018 | Joannopoulos |
| 10,141,794 B2 | 11/2018 | Harper |
| 10,141,851 B2 | 11/2018 | Raju |
| 10,148,117 B2 | 12/2018 | Lethellier |
| 10,158,251 B2 | 12/2018 | McCauley |
| 10,158,357 B1 | 12/2018 | Vinciarelli |
| 10,186,372 B2 | 1/2019 | John |
| 10,186,373 B2 | 1/2019 | Kurs |
| 10,186,974 B2 | 1/2019 | Yang |
| 10,193,459 B2 | 1/2019 | Torrico-Bascopé |
| 10,199,160 B2 | 2/2019 | Lestoquoy |
| 10,205,384 B2 | 2/2019 | Lethellier |
| 10,211,681 B2 | 2/2019 | Roy |
| 10,211,719 B2 | 2/2019 | Tanaka |
| 10,211,745 B2 | 2/2019 | Murakami |
| 10,211,746 B1 | 2/2019 | Lin |
| 10,217,558 B2 | 2/2019 | Kneller |
| 10,217,559 B2 | 2/2019 | Yang |
| 10,218,224 B2 | 2/2019 | Campanella |
| 10,218,307 B2 | 2/2019 | Alon |
| 10,230,243 B2 | 3/2019 | Schatz |
| 10,248,899 B2 | 4/2019 | Kesler |
| 10,256,511 B2 | 4/2019 | Clemente |
| 10,263,473 B2 | 4/2019 | DeBaun |
| 10,263,530 B2 | 4/2019 | Zeng |
| 10,264,352 B2 | 4/2019 | Ganem |
| 10,269,486 B2 | 4/2019 | Abdolkhani |
| 10,277,080 B2 | 4/2019 | Milvert |
| 10,277,105 B1 | 4/2019 | Vinciarelli |
| 10,284,028 B2 | 5/2019 | Lethellier |
| 10,300,800 B2 | 5/2019 | Kurs |
| 10,306,724 B2 | 5/2019 | Homsi |
| RE47,423 E | 6/2019 | Hsiao |
| 10,312,692 B2 | 6/2019 | Arditi |
| 10,325,719 B2 | 6/2019 | Abdolkhani |
| 10,340,745 B2 | 7/2019 | Kurs |
| 10,348,136 B2 | 7/2019 | John |
| 10,361,654 B2 | 7/2019 | Alon |
| 10,367,369 B2 | 7/2019 | Partovi |
| 10,371,848 B2 | 8/2019 | Roy |
| 10,374,520 B2 | 8/2019 | Wagner |
| 10,381,883 B2 | 8/2019 | Harper |
| 10,381,914 B2 | 8/2019 | Chen |
| 10,381,934 B2 | 8/2019 | Yang |

(56)         References Cited

U.S. PATENT DOCUMENTS

| 10,389,258 | B2 | 8/2019 | Njiende |
| 10,395,819 | B2 | 8/2019 | Wukovits |
| 10,410,789 | B2 | 9/2019 | Kurs |
| 10,420,951 | B2 | 9/2019 | John |
| 10,424,936 | B2 | 9/2019 | Garrity |
| 10,424,976 | B2 | 9/2019 | Verghese |
| 10,446,317 | B2 | 10/2019 | Hall |
| 10,454,381 | B2 | 10/2019 | Li |
| 10,461,654 | B2 | 10/2019 | Wu |
| 10,476,403 | B2 | 11/2019 | Deboy |
| 10,492,283 | B2 | 11/2019 | Leibl |
| 10,498,245 | B2 | 12/2019 | Njiende T. |
| 10,536,034 | B2 | 1/2020 | Kurs |
| 10,559,405 | B2 | 2/2020 | Lethellier |
| 10,559,980 | B2 | 2/2020 | Kurs |
| 10,574,084 | B2 | 2/2020 | Ghosh |
| 10,574,091 | B2 | 2/2020 | Lestoquoy |
| 10,581,334 | B2 | 3/2020 | Zong |
| 10,594,225 | B1 | 3/2020 | Lin |
| 10,608,549 | B2 | 3/2020 | Zeng |
| 10,630,191 | B2 | 4/2020 | Ji |
| 10,637,292 | B2 | 4/2020 | DeBaun |
| 10,637,294 | B2 | 4/2020 | Sarwat |
| 10,644,603 | B2 | 5/2020 | Graves |
| 10,644,613 | B2 | 5/2020 | Aldhaher |
| 10,651,688 | B2 | 5/2020 | Karnstedt |
| 10,651,689 | B2 | 5/2020 | Karnstedt |
| 10,666,091 | B2 | 5/2020 | Joannopoulos |
| 10,673,222 | B2 | 6/2020 | Yoscovich |
| 10,673,229 | B2 | 6/2020 | Yoscovich |
| 10,673,244 | B2 | 6/2020 | Arditi |
| 10,673,245 | B2 | 6/2020 | Arditi |
| 10,673,282 | B2 | 6/2020 | Campanella |
| 10,686,336 | B2 | 6/2020 | Masquelier |
| 10,686,337 | B2 | 6/2020 | Roy |
| 10,696,182 | B2 | 6/2020 | Khaligh |
| 10,714,986 | B2 | 7/2020 | Partovi |
| 10,715,050 | B2 | 7/2020 | Torrico-Bascopé |
| 10,734,842 | B2 | 8/2020 | Karalis |
| 10,750,587 | B2 | 8/2020 | Homsi |
| 10,756,545 | B2 | 8/2020 | Arditi |
| 10,770,981 | B2 | 9/2020 | Hsiao |
| 10,778,047 | B2 | 9/2020 | Verghese |
| 10,778,107 | B2 | 9/2020 | Liu |
| 10,784,765 | B1 | 9/2020 | Vinciarelli |
| 10,790,080 | B2 | 9/2020 | Kneller |
| 10,790,081 | B2 | 9/2020 | Fei |
| 10,804,807 | B2 | 10/2020 | Saha |
| 10,806,181 | B2 | 10/2020 | Sur |
| 10,811,985 | B2 | 10/2020 | Chennamsetty |
| 10,819,117 | B2 | 10/2020 | Grana |
| 10,819,165 | B2 | 10/2020 | Milvert |
| 10,819,244 | B1 | 10/2020 | Shi |
| 10,826,329 | B2 | 11/2020 | Lethellier |
| 10,847,297 | B1 | 11/2020 | Hsu |
| 10,855,190 | B2 | 12/2020 | Yang |
| 10,873,265 | B2 | 12/2020 | Xue |
| 10,875,414 | B2 | 12/2020 | Partovi |
| 10,903,690 | B2 | 1/2021 | Lethellier |
| 10,903,734 | B1 | 1/2021 | Vinciarelli |
| 10,913,368 | B2 | 2/2021 | Kurs |
| 10,917,019 | B2 | 2/2021 | Yelaverthi |
| 10,923,921 | B2 | 2/2021 | McCauley |
| 10,931,228 | B2 | 2/2021 | Yoscovich |
| 10,951,123 | B2 | 3/2021 | Hsiao |
| 10,958,104 | B2 | 3/2021 | Abdolkhani |
| 10,958,182 | B2 | 3/2021 | Ji |
| 10,965,156 | B2 | 3/2021 | Peretz |
| 10,984,945 | B2 | 4/2021 | Nagaoka |
| 10,992,233 | B2 | 4/2021 | Dincan |
| 10,998,823 | B2 | 5/2021 | Raymond |
| 10,998,903 | B1 | 5/2021 | Vinciarelli |
| 11,005,285 | B2 | 5/2021 | Partovi |
| 11,018,529 | B2 | 5/2021 | Bagchi |
| 2001/0022732 | A1 | 9/2001 | Yasumura |

| 2001/0024373 | A1 | 9/2001 | Cuk |
| 2002/0030961 | A1 | 3/2002 | Waffenschmidt |
| 2002/0039298 | A1 | 4/2002 | Riggio |
| 2002/0125854 | A1 | 9/2002 | Williamson |
| 2002/0167255 | A1 | 11/2002 | Roberts |
| 2002/0172056 | A1 | 11/2002 | Riggio |
| 2002/0176263 | A1 | 11/2002 | Riggio |
| 2002/0181250 | A1 | 12/2002 | Riggio |
| 2003/0002303 | A1 | 1/2003 | Riggio |
| 2003/0125773 | A1 | 7/2003 | Havel |
| 2003/0142513 | A1 | 7/2003 | Vinciarelli |
| 2003/0227280 | A1 | 12/2003 | Vinciarelli |
| 2004/0012986 | A1 | 1/2004 | Riggio |
| 2004/0116967 | A1 | 6/2004 | DeGroot |
| 2004/0129448 | A1 | 7/2004 | de Rooij |
| 2004/0174147 | A1 | 9/2004 | Vinciarelli |
| 2004/0183513 | A1 | 9/2004 | Vinciarelli |
| 2004/0184289 | A1 | 9/2004 | Vinciarelli |
| 2004/0208025 | A1 | 10/2004 | Adler |
| 2004/0239463 | A1* | 12/2004 | Poniatowski ........... H01F 29/14 |
| | | | 336/10 |
| 2005/0001707 | A1* | 1/2005 | Elliott .................... H01F 17/06 |
| | | | 336/200 |
| 2005/0006380 | A1 | 1/2005 | Kagan |
| 2005/0110606 | A1 | 5/2005 | Vinciarelli |
| 2005/0228453 | A1 | 10/2005 | Havel |
| 2005/0258926 | A1 | 11/2005 | Weger |
| 2005/0281059 | A1 | 12/2005 | Yasumura |
| 2005/0286270 | A1 | 12/2005 | Petkov |
| 2005/0286271 | A1 | 12/2005 | Vinciarelli |
| 2006/0076338 | A1 | 4/2006 | Kagan |
| 2006/0077600 | A1 | 4/2006 | Yasumura |
| 2006/0114697 | A1 | 6/2006 | Yasumura |
| 2006/0139970 | A1 | 6/2006 | Cheng |
| 2006/0164870 | A1 | 7/2006 | Yasumura |
| 2006/0176714 | A1 | 8/2006 | Yasumura |
| 2006/0187687 | A1 | 8/2006 | Yasumura |
| 2006/0209576 | A1 | 9/2006 | Yasumura |
| 2006/0219709 | A1 | 10/2006 | Kagan |
| 2006/0227576 | A1 | 10/2006 | Yasumura |
| 2006/0239039 | A1 | 10/2006 | Yasumura |
| 2007/0011836 | A1 | 1/2007 | Brewer |
| 2007/0035971 | A1 | 2/2007 | Yasumura |
| 2007/0076443 | A1 | 4/2007 | Yasumura |
| 2007/0079455 | A1 | 4/2007 | Brewer |
| 2007/0081365 | A1 | 4/2007 | Yasumura |
| 2007/0086219 | A1 | 4/2007 | Yasumura |
| 2007/0157404 | A1 | 7/2007 | Brewer |
| 2007/0195560 | A1 | 8/2007 | Yasumura |
| 2007/0201251 | A1 | 8/2007 | Yasumura |
| 2007/0236963 | A1 | 10/2007 | Yasumura |
| 2008/0001695 | A1 | 1/2008 | Riggio |
| 2008/0025052 | A1 | 1/2008 | Yasumura |
| 2008/0055941 | A1 | 3/2008 | Victor |
| 2008/0094860 | A1 | 4/2008 | Falk |
| 2008/0101099 | A1 | 5/2008 | Jacobs |
| 2008/0137381 | A1 | 6/2008 | Beasley |
| 2008/0186742 | A1 | 8/2008 | Seong |
| 2008/0209650 | A1 | 9/2008 | Brewer |
| 2008/0224809 | A1 | 9/2008 | Zhang |
| 2008/0238386 | A1 | 10/2008 | Kagan |
| 2008/0259645 | A1 | 10/2008 | Herty |
| 2008/0316773 | A1 | 12/2008 | Neubarth |
| 2009/0001403 | A1 | 1/2009 | Skipor |
| 2009/0046482 | A1 | 2/2009 | Smith |
| 2009/0290385 | A1 | 11/2009 | Jungreis |
| 2009/0295300 | A1 | 12/2009 | King |
| 2009/0295524 | A1 | 12/2009 | Silva |
| 2009/0303753 | A1 | 12/2009 | Fu |
| 2009/0309573 | A1 | 12/2009 | Lurkens |
| 2009/0323380 | A1 | 12/2009 | Harrison |
| 2010/0019874 | A1 | 1/2010 | Melanson |
| 2010/0127570 | A1 | 5/2010 | Hadar |
| 2010/0134082 | A1 | 6/2010 | Kagan |
| 2010/0254163 | A1 | 10/2010 | Martini |
| 2010/0259241 | A1 | 10/2010 | Cuk |
| 2010/0301676 | A1 | 12/2010 | Hernandez |
| 2011/0002145 | A1 | 1/2011 | Halberstadt |
| 2011/0007528 | A1 | 1/2011 | Scheel |

(56)    References Cited

U.S. PATENT DOCUMENTS

| | | |
|---|---|---|
| 2011/0057640 A1 | 3/2011 | Cuk |
| 2011/0063065 A1 | 3/2011 | Hugues Douglas |
| 2011/0080056 A1 | 4/2011 | Low |
| 2011/0080757 A1 | 4/2011 | Young |
| 2011/0139771 A1 | 6/2011 | Dohmeier |
| 2011/0248812 A1 | 10/2011 | Hu |
| 2011/0317452 A1 | 12/2011 | Anguelov |
| 2012/0001612 A1 | 1/2012 | Cuk |
| 2012/0014138 A1 | 1/2012 | Ngo |
| 2012/0056704 A1* | 3/2012 | Nagano ................ H01F 27/366 |
| | | 336/212 |
| 2012/0063177 A1 | 3/2012 | Garrity |
| 2012/0081200 A1 | 4/2012 | Silva |
| 2012/0106207 A1 | 5/2012 | Tsai |
| 2012/0146576 A1 | 6/2012 | Partovi |
| 2012/0192476 A1 | 8/2012 | Compton |
| 2012/0235636 A1 | 9/2012 | Partovi |
| 2012/0253541 A1 | 10/2012 | Arditi |
| 2012/0255591 A1 | 10/2012 | Arditi |
| 2012/0262954 A1 | 10/2012 | Duvnjak |
| 2012/0262967 A1 | 10/2012 | Cuk |
| 2012/0268969 A1 | 10/2012 | Cuk |
| 2012/0281436 A1 | 11/2012 | Cuk |
| 2012/0320648 A1 | 12/2012 | Harrison |
| 2013/0020672 A1 | 1/2013 | Tipton |
| 2013/0026839 A1 | 1/2013 | Grana |
| 2013/0026840 A1 | 1/2013 | Arditi |
| 2013/0026842 A1 | 1/2013 | Arditi |
| 2013/0026843 A1 | 1/2013 | Arditi |
| 2013/0057164 A1 | 3/2013 | Gruber |
| 2013/0063185 A1 | 3/2013 | Ye |
| 2013/0063985 A1 | 3/2013 | Ye |
| 2013/0093389 A1 | 4/2013 | Partovi |
| 2013/0093390 A1 | 4/2013 | Partovi |
| 2013/0099735 A1 | 4/2013 | Partovi |
| 2013/0119927 A1 | 5/2013 | Partovi |
| 2013/0119928 A1 | 5/2013 | Partovi |
| 2013/0119929 A1 | 5/2013 | Partovi |
| 2013/0170252 A1 | 7/2013 | Nishino |
| 2013/0182462 A1 | 7/2013 | Sorge |
| 2013/0187561 A1 | 7/2013 | Franck |
| 2013/0187595 A1 | 7/2013 | Bucher |
| 2013/0188397 A1 | 7/2013 | Wu |
| 2013/0194831 A1 | 8/2013 | Hu |
| 2013/0207468 A1 | 8/2013 | Wu |
| 2013/0207601 A1 | 8/2013 | Wu |
| 2013/0229842 A1 | 9/2013 | Garrity |
| 2013/0234526 A1 | 9/2013 | Jacobson |
| 2013/0242616 A1 | 9/2013 | Oldenkamp |
| 2013/0249479 A1 | 9/2013 | Partovi |
| 2013/0258720 A1 | 10/2013 | Worek |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2013/0313982 A1 | 11/2013 | Reed |
| 2013/0314951 A1 | 11/2013 | Harrison |
| 2013/0343091 A1 | 12/2013 | Njiende T. |
| 2014/0016373 A1 | 1/2014 | Zhang |
| 2014/0043127 A1 | 2/2014 | Worek |
| 2014/0047754 A1 | 2/2014 | Compton |
| 2014/0132210 A1 | 5/2014 | Partovi |
| 2014/0132380 A1* | 5/2014 | Jacobson ................ H01F 27/24 |
| | | 29/605 |
| 2014/0133189 A1 | 5/2014 | Worek |
| 2014/0146571 A1 | 5/2014 | Ryoo |
| 2014/0146574 A1 | 5/2014 | Worek |
| 2014/0254203 A1 | 9/2014 | Dai |
| 2014/0254208 A1 | 9/2014 | Dai |
| 2014/0268898 A1 | 9/2014 | Zimmanck |
| 2014/0321169 A1 | 10/2014 | Mueller |
| 2014/0327313 A1 | 11/2014 | Arditi |
| 2014/0347008 A1 | 11/2014 | Chae |
| 2015/0015197 A1 | 1/2015 | Mi |
| 2015/0015356 A1* | 1/2015 | Jacobson ................ H01F 41/10 |
| | | 29/605 |
| 2015/0016159 A1 | 1/2015 | Deboy |
| 2015/0020427 A1 | 1/2015 | Compton |
| 2015/0085969 A1 | 3/2015 | Mekonnen |
| 2015/0109831 A1 | 4/2015 | Ohashi |
| 2015/0109833 A1 | 4/2015 | Garrity |
| 2015/0130412 A1 | 5/2015 | Partovi |
| 2015/0155095 A1 | 6/2015 | Wu |
| 2015/0180350 A1 | 6/2015 | Huang |
| 2015/0195878 A1 | 7/2015 | Garrity |
| 2015/0210229 A1 | 7/2015 | Milvert |
| 2015/0228393 A1 | 8/2015 | Waffler |
| 2015/0256092 A1 | 9/2015 | Garrity |
| 2015/0289331 A1 | 10/2015 | Chen |
| 2015/0318106 A1 | 11/2015 | Pollock |
| 2015/0357821 A1 | 12/2015 | Grana |
| 2015/0360574 A1 | 12/2015 | Czainski |
| 2016/0009554 A1 | 1/2016 | Gueh |
| 2016/0016479 A1 | 1/2016 | Khaligh |
| 2016/0056664 A1 | 2/2016 | Partovi |
| 2016/0094047 A1 | 3/2016 | Finkenzeller |
| 2016/0094141 A1 | 3/2016 | Petkov |
| 2016/0111197 A1 | 4/2016 | Kneller |
| 2016/0111200 A1 | 4/2016 | Kneller |
| 2016/0141951 A1 | 5/2016 | Mao |
| 2016/0156308 A1 | 6/2016 | Alon |
| 2016/0254755 A1 | 9/2016 | Deboy |
| 2016/0276955 A1 | 9/2016 | Harada |
| 2016/0285272 A1 | 9/2016 | Arditi |
| 2016/0322912 A1 | 11/2016 | Ohashi |
| 2016/0344194 A1 | 11/2016 | Arditi |
| 2016/0349012 A1 | 12/2016 | Compton |
| 2016/0372801 A1 | 12/2016 | Clemente |
| 2016/0380469 A1 | 12/2016 | Lethellier |
| 2017/0012435 A1 | 1/2017 | Arditi |
| 2017/0033693 A1 | 2/2017 | Madawala |
| 2017/0054378 A1 | 2/2017 | Njiende T. |
| 2017/0057370 A1 | 3/2017 | Harper |
| 2017/0063170 A1 | 3/2017 | Harper |
| 2017/0085093 A1 | 3/2017 | Arditi |
| 2017/0104365 A1 | 4/2017 | Ghosh |
| 2017/0117810 A1 | 4/2017 | Ghosh |
| 2017/0133943 A1 | 5/2017 | Garrity |
| 2017/0141695 A1 | 5/2017 | Zeng |
| 2017/0155342 A1 | 6/2017 | Deboy |
| 2017/0214330 A1 | 7/2017 | Yang |
| 2017/0221625 A1 | 8/2017 | Sullivan |
| 2017/0279287 A1 | 9/2017 | Solodovnik |
| 2017/0291495 A1 | 10/2017 | Blum |
| 2017/0294259 A1 | 10/2017 | Yang |
| 2017/0294833 A1 | 10/2017 | Yang |
| 2017/0330678 A1 | 11/2017 | Harrison |
| 2017/0331383 A1 | 11/2017 | Hsiao |
| 2017/0346348 A1 | 11/2017 | Lethellier |
| 2017/0353150 A1 | 12/2017 | Alon |
| 2017/0371367 A1 | 12/2017 | Liu |
| 2018/0061560 A1 | 3/2018 | Wukovits |
| 2018/0063932 A1 | 3/2018 | Leibl |
| 2018/0076723 A1 | 3/2018 | Li |
| 2018/0109113 A1 | 4/2018 | Grana |
| 2018/0123534 A1 | 5/2018 | Mendenhall |
| 2018/0138801 A1 | 5/2018 | Chen |
| 2018/0175735 A1 | 6/2018 | Zhao |
| 2018/0191235 A1 | 7/2018 | Chen |
| 2018/0191236 A1 | 7/2018 | Wagoner |
| 2018/0194237 A1 | 7/2018 | Sarwat |
| 2018/0198373 A1 | 7/2018 | Torrico-Bascopé |
| 2018/0205315 A1 | 7/2018 | Giuliano |
| 2018/0222333 A1 | 8/2018 | Khaligh |
| 2018/0240588 A1 | 8/2018 | Nagaoka |
| 2018/0269691 A1 | 9/2018 | Garrity |
| 2018/0277299 A1 | 9/2018 | Wang |
| 2018/0278174 A1 | 9/2018 | Chen |
| 2018/0278204 A1 | 9/2018 | Alon |
| 2018/0279437 A1 | 9/2018 | Homsi |
| 2018/0321734 A1 | 11/2018 | Wu |
| 2018/0323720 A1 | 11/2018 | Njiende |
| 2018/0342953 A1 | 11/2018 | Ji |

(56) References Cited

U.S. PATENT DOCUMENTS

| | | |
|---|---|---|
| 2018/0351415 A1 | 12/2018 | Masquelier |
| 2018/0367030 A1 | 12/2018 | Lethellier |
| 2018/0375436 A1 | 12/2018 | Wagner |
| 2019/0020210 A1 | 1/2019 | Partovi |
| 2019/0068065 A1 | 2/2019 | Tanino |
| 2019/0097447 A1 | 3/2019 | Partovi |
| 2019/0097448 A1 | 3/2019 | Partovi |
| 2019/0103210 A1 | 4/2019 | Elferich |
| 2019/0103767 A1 | 4/2019 | Lethellier |
| 2019/0148052 A1 | 5/2019 | Kneller |
| 2019/0156989 A1* | 5/2019 | Hu ........................ H01F 41/02 |
| 2019/0173422 A1 | 6/2019 | Alon |
| 2019/0181768 A1 | 6/2019 | Chennamsetty |
| 2019/0199134 A1 | 6/2019 | Lethellier |
| 2019/0199232 A1 | 6/2019 | Zeng |
| 2019/0237219 A1 | 8/2019 | Lethellier |
| 2019/0245390 A1 | 8/2019 | Milvert |
| 2019/0245451 A1 | 8/2019 | Sagneri |
| 2019/0252114 A1 | 8/2019 | Lu |
| 2019/0252921 A1 | 8/2019 | Lethellier |
| 2019/0288607 A1 | 9/2019 | Zong |
| 2019/0312516 A1 | 10/2019 | Yang |
| 2019/0312517 A1 | 10/2019 | Yang |
| 2019/0319487 A1 | 10/2019 | Hui |
| 2019/0372406 A1 | 12/2019 | Partovi |
| 2019/0373697 A1 | 12/2019 | Homsi |
| 2019/0379291 A1 | 12/2019 | Xue |
| 2019/0386571 A1 | 12/2019 | Dincan |
| 2020/0036214 A1 | 1/2020 | Partovi |
| 2020/0044571 A1 | 2/2020 | Bouchez |
| 2020/0044572 A1 | 2/2020 | Bouchez |
| 2020/0083817 A1 | 3/2020 | Liu |
| 2020/0083818 A1 | 3/2020 | Lin |
| 2020/0135387 A1 | 4/2020 | Lutze |
| 2020/0136518 A1 | 4/2020 | Ji |
| 2020/0136521 A1 | 4/2020 | Lin |
| 2020/0170141 A1 | 5/2020 | Spesser |
| 2020/0189731 A1 | 6/2020 | Mistry |
| 2020/0205262 A1 | 6/2020 | Ackermann |
| 2020/0211755 A1 | 7/2020 | Liu |
| 2020/0212795 A1 | 7/2020 | Das |
| 2020/0212816 A1 | 7/2020 | Sun |
| 2020/0225684 A1 | 7/2020 | Anderson |
| 2020/0231064 A1 | 7/2020 | Zhao |
| 2020/0258680 A1 | 8/2020 | Wambsganss |
| 2020/0287413 A1 | 9/2020 | Peretz |
| 2020/0287470 A1 | 9/2020 | Saha |
| 2020/0290467 A1 | 9/2020 | Gao |
| 2020/0295569 A1 | 9/2020 | Arditi |
| 2020/0295663 A1 | 9/2020 | Yelaverthi |
| 2020/0304030 A1 | 9/2020 | Jin |
| 2020/0313249 A1 | 10/2020 | Zhao |
| 2020/0313443 A1 | 10/2020 | ElMenshawy |
| 2020/0313463 A1 | 10/2020 | Masquelier |
| 2020/0358292 A1 | 11/2020 | Arditi |
| 2020/0358380 A1 | 11/2020 | Gabrys |
| 2020/0373785 A1 | 11/2020 | Bagchi |
| 2020/0381165 A1 | 12/2020 | Polivka |
| 2020/0381176 A1 | 12/2020 | Kolar |
| 2020/0388436 A1 | 12/2020 | Sattel |
| 2020/0395164 A1 | 12/2020 | Ahmed |
| 2020/0411234 A1 | 12/2020 | Sarrafin-Ardebili |
| 2021/0012943 A1 | 1/2021 | Ebner |
| 2021/0013746 A1 | 1/2021 | Lethellier |
| 2021/0028697 A1 | 1/2021 | Giuliano |
| 2021/0083571 A1 | 3/2021 | Giuliano |
| 2021/0083589 A1 | 3/2021 | Dong |
| 2021/0099096 A1 | 4/2021 | Escudero Rodriguez |
| 2021/0110970 A1 | 4/2021 | Kotani |
| 2021/0111632 A1 | 4/2021 | Shi |
| 2021/0143731 A1 | 5/2021 | Ji |
| 2021/0155100 A1 | 5/2021 | Khaligh |
| 2021/0155104 A1 | 5/2021 | Skutt |
| 2021/0225573 A1* | 7/2021 | Ma ........................ H01F 3/14 |

* cited by examiner

HIGH FREQUENCY INTEGRATED PLANAR MAGNETICS FOR A BIDIRECTIONAL AC TO DC CLLC RESONANT CONVERTER

CROSS REFERENCE TO RELATED APPLICATIONS

The present application is a non-provisional of, and claims benefit of priority from, U.S. Provisional Patent Application No. 63/203,015, filed Jul. 4, 2021, the entirety of which is expressly incorporated herein by reference.

STATEMENT OF GOVERNMENT RIGHTS

This invention was made with support of the New York State Energy Research and Development Authority (NYSERDA) under Agreement Number 138104 and NYSERDA may have rights in the invention.

FIELD OF THE INVENTION

The present invention relates to the field of CLLC resonant converters, and more particularly to a bidirectional AC to DC CLLC resonant converter employing planar magnetics.

BACKGROUND OF THE INVENTION

Citation or identification of any reference herein, in any section of this application, shall not be construed as an admission that such reference is available as prior art to the present application. The disclosures of each reference disclosed herein, whether U.S. or foreign patent literature, or non-patent literature, are hereby incorporated by reference in their entirety in this application, and shall be treated as if the entirety thereof forms a part of this application.

Such references are provided for their disclosure of technologies to enable practice of the present invention, to provide basis for claim language, to make clear applicant's possession of the invention with respect to the various aggregates, combinations, and subcombinations of the respective disclosures or portions thereof (within a particular reference or across multiple references). The citation of references is intended to be part of the disclosure of the invention, and not merely supplementary background information. The incorporation by reference does not extend to teachings which are inconsistent with the invention as expressly described herein, and is evidence of a proper interpretation by persons of ordinary skill in the art of the terms, phrase and concepts discussed herein, without being limiting as the sole interpretation available.

In Electric Vehicles (EVs) and forklift battery chargers, there is a great demand for high power density and efficient bidirectional AC to DC power electronics converter, to facility use of electrical power and thereby alleviate the fuel consumption. In these applications, the power converter is connected to the grid and the battery is connected to the DC output of the converter with a high-voltage DC link connecting the AC to DC converter and the DC to DC converter. Commonly, the DC link voltage goes to >700V and DC output voltage typically varies from 25V-55V for a nominal 48V lead-acid battery following the State of Charge (SOC) of the battery. Therefore, inherently the converter requires a high step down voltage conversion.

A CLLC resonant converter is the best suited for this kind of application. In this resonant converter, the magnetic elements (i.e., inductors and transformers) are integral part of the system. A reduced volume, and efficient magnetic design are desired to achieve high power density, and high efficiency resonant power converter respectively. To achieve these essential requirements, a planar magnetic structure operating at hundreds of kilohertz frequency with interleaving windings layout has been well studied. The planar transformers have a low height. Nevertheless, all these magnetic arrangements are limited to certain design specifications (i.e., turns ratio, resonant inductance, voltage, and current levels).

Theoretically, in a CLLC bidirectional resonant converter, the magnetic part consists of the resonant inductor and the high frequency (HF) transformer. This converter is designed to have a soft switching across the semiconductor devices (i.e., MOSFETs, GaN) to reduce the switching loss. The series combination of capacitor and inductors on each side of the HF (e.g., 100 kHz operating frequency) transformer, along with the parallel magnetizing inductance of the transformer, form the CLLC resonant tank used for bidirectional energy transfer in the converter as shown in FIG. 1.

In a transformer, there exists leakage inductance on both primary and secondary windings, due to the non-coupled portion of the magnetic flux, which can be utilized to form the series inductors on the two sides of the transformer by use of non-conventional core shapes requiring special manufacturing processes. To integrate substantial value of the series inductors, the leakage flux has to be increased. On the other hand, increased leakage flux can affect the EMI and the HF AC losses in the windings, especially when the rate of change of voltage (i.e., dv/dt) is very high (e.g., 1 kV/10 µS).

CN107818865B discloses a high frequency center tap flat surface transformer for use in a LLC half bridge resonant converter, using eight layers of structure. Magnetic cores are spaced vertically by prepreg sheets on which the windings are fabricated.

FR3019933A1 discloses a transformer with core elements separated by gaps.

See also, U.S. Patent and Published patents application Nos. 20210155104; 20210155100; 20210143731; 20210111632; 20210110970; 20210099096; 20210083589; 20210083571; 20210028697; 20210013746; 20210012943; 20200411234; 20200395164; 20200388436; 20200381176; 20200381165; 20200373785; 20200358380; 20200358292; 20200313463; 20200313443; 20200313249; 20200304030; 20200295663; 20200295569; 20200290467; 20200287470; 20200287413; 20200258680; 20200231064; 20200225684; 20200212816; 20200212795; 20200211755; 20200205262; 20200189731; 20200170141; 20200136521; 20200136518; 20200135387; 20200083818; 20200083817; 20200044572; 20200044571; 20200036214; 20190386571; 20190379291; 20190373697; 20190372406; 20190319487; 20190312517; 20190312516; 20190288607; 20190252921; 20190252114; 20190245451; 20190245390; 20190237219; 20190199232; 20190199134; 20190181768; 20190173422; 20190148052; 20190103767; 20190103210; 20190097448; 20190097447; 20190068065; 20190020210; 20180375436; 20180367030; 20180351415; 20180342953; 20180323720; 20180321734; 20180279437; 20180278204; 20180278174; 20180277299; 20180269691; 20180240588; 20180222333; 20180205315; 20180198373; 20180194237; 20180191236; 20180191235; 20180175735; 20180138801; 20180123534; 20180109113; 20180076723; 20180063932; 20180061560; 20170371367; 20170353150; 20170346348; 20170331383; 20170330678; 20170294833; 20170294259; 20170291495; 20170279287; 20170221625; 20170214330; 20170155342; 20170141695; 20170133943; 20170117810; 20170104365; 20170085093; 20180076723; 20170063170; 20170057370; 20170054378;

20170033693; 20170012435; 20160380469; 20160372801; 20160349012; 20160344194; 20160322912; 20160285272; 20160276955; 20160254755; 20160156308; 20160141951; 20160111200; 20160111197; 20160094141; 20160094047; 20160056664; 20160016479; 20160009554; 20150360574; 20150357821; 20150318106; 20150289331; 20150256092; 20150228393; 20150210229; 20150195878; 20150180350; 20150155095; 20150130412; 20150109833; 20150109831; 20150085969; 20150020427; 20150016159; 20150015356; 20150015197; 20140347008; 20140327313; 20140321169; 20140268898; 20140254208; 20140254203; 20140146574; 20140146571; 20140133189; 20140132210; 20140047754; 20140043127; 20140016373; 20130343091; 20130314951; 20130313982; 20130300204; 20130285605; 20130285604; 20130271069; 20130258720; 20130249479; 20130242616; 20130234526; 20130229842; 20130207601; 20130207468; 20130194831; 20130188397; 20130187595; 20130187561; 20130182462; 20130170252; 20130119929; 20130119928; 20130119927; 20130099735; 20130093390; 20130093389; 20130063985; 20130063185; 20130057164; 20130026843; 20130026842; 20130026840; 20130026839; 20130020672; 20120320648; 20120281436; 20120268969; 20120262967; 20120262954; 20120255591; 20120253541; 20120235636; 20120192476; 20120146576; 20120106207; 20120081200; 20120063177; 20120014138; 20120001612; 20110317452; 20110248812; 20110139771; 20110080757; 20110080056; 20110063065; 20110057640; 20110007528; 20110002145; 20100301676; 20100259241; 20100254163; 20100134082; 20100127570; 20100019874; 20090323380; 20090309573; 20090303753; 20090295524; 20090295300; 20090290385; 20090046482; 20090001403; 20080316773; 20080259645; 20080238386; 20080224809; 20080209650; 20080186742; 20080137381; 20080101099; 20080094860; 20080055941; 20080025052; 20080001695; 20070236963; 20070201251; 20070195560; 20070157404; 20070086219; 20070081365; 20070079455; 20070076443; 20070035971; 20070011836; 20060239039; 20060227576; 20060219709; 20060209576; 20060187687; 20060176714; 20060164870; 20060139970; 20060114697; 20060077600; 20060076338; 20050286271; 20050286270; 20050281059; 20050258926; 20050228453; 20050110606; 20050006380; 20040208025; 20040184289; 20040183513; 20040174147; 20040129448; 20040116967; 20040012986; 20030227280; 20030142513; 20030125773; 20030002303; 20020181250; 20020176263; 20020172056; 20020167255; 20020125854; 20020039298; 20020030961; 20010024373; 20010022732; U.S. Pat. Nos. 11,018,529; 11,005,285; 10,998,903; 10,998,823; 10,992,233; 10,984, 945; 10,965,156; 10,958,182; 10,958,104; 10,951,123; 10,931,228; 10,923,921; 10,917,019; 10,913,368; 10,903, 734; 10,903,690; 10,875,414; 10,873,265; 10,855,190; 10,847,297; 10,826,329; 10,819,244; 10,819,165; 10,819, 117; 10,811,985; 10,806,181; 10,804,807; 10,790,081; 10,790,080; 10,784,765; 10,778,107; 10,778,047; 10,770, 981; 10,756,545; 10,750,587; 10,734,842; 10,715,050; 10,714,986; 10,696,182; 10,686,337; 10,686,336; 10,673, 282; 10,673,245; 10,673,244; 10,673,229; 10,673,222; 10,666,091; 10,651,689; 10,651,688; 10,644,613; 10,644, 603; 10,637,294; 10,637,292; 10,630,191; 10,608,549; 10,594,225; 10,581,334; 10,574,091; 10,574,084; 10,559, 980; 10,559,405; 10,536,034; 10,498,245; 10,492,283; 10,476,403; 10,461,654; 10,454,381; 10,446,317; 10,424, 976; 10,424,936; 10,420,951; 10,410,789; 10,395,819; 10,389,258; 10,381,934; 10,381,914; 10,381,883; 10,374, 520; 10,371,848; 10,367,369; 10,361,654; 10,348,136; 10,340,745; 10,325,719; RE47,423; U.S. Pat. Nos. 10,312, 692; 10,306,724; 10,300,800; 10,284,028; 10,277,105; 10,277,080; 10,269,486; 10,264,352; 10,263,530; 10,263,

473; 10,256,511; 10,248,899; 10,230,243; 10,218,307; 10,218,224; 10,217,559; 10,217,558; 10,211,746; 10,211, 745; 10,211,719; 10,211,681; 10,205,384; 10,199,160; 10,193,459; 10,186,974; 10,186,373; 10,186,372; 10,158, 357; 10,158,251; 10,148,117; 10,141,851; 10,141,794; 10,141,790; 10,141,788; 10,141,770; 10,135,348; 10,115, 520; 10,097,044; 10,097,011; 10,084,348; 10,083,791; 10,079,557; 10,075,086; 10,075,028; 10,075,019; 10,074, 474; 10,063,110; 10,063,104; 10,063,077; 10,060,705; 10,027,184; 10,018,744; 10,014,722; 10,008,858; 10,003, 275; 10,003,267; 9,991,843; 9,979,273; 9,973,158; 9,959, 972; 9,956,639; 9,954,375; 9,952,266; 9,948,145; 9,943, 697; 9,941,045; 9,933,805; 9,931,951; 9,929,721; 9,921, 028; 9,919,610; 9,906,147; 9,897,411; 9,892,849; 9,891, 023; 9,857,821; 9,855,620; 9,853,568; 9,847,646; 9,847, 166; 9,843,230; 9,843,228; 9,843,217; 9,842,688; 9,842, 687; 9,842,684; 9,837,860; 9,837,846; 9,831,722; 9,876, 434; 9,831,682; 9,806,541; 9,793,721; 9,789,778; 9,789, 777; 9,787,204; 9,787,141; 9,786,423; 9,780,605; 9,780, 573; 9,761,370; 9,754,718; 9,748,039; 9,744,858; 9,742, 204; 9,722,447; 9,712,045; 9,711,991; 9,705,409; 9,698, 607; 9,662,161; 9,608,530; 9,602,168; 9,602,025; 9,601, 266; 9,601,261; 9,596,005; 9,595,378; 9,590,456; 9,584, 189; 9,584,036; 9,583,255; 9,577,440; 9,577,436; 9,559, 602; 9,554,431; 9,544,956; 9,544,683; 9,543,455; 9,537, 403; 9,525,376; 9,525,364; 9,515,562; 9,515,495; 9,515, 494; 9,514,875; 9,509,223; 9,509,147; 9,502,921; 9,496, 732; 9,496,719; 9,494,631; 9,465,064; 9,461,501; 9,461, 479; 9,450,422; 9,450,421; 9,449,757; 9,444,520; 9,444, 265; 9,442,172; 9,431,825; 9,425,622; 9,421,388; 9,414, 462; 9,413,255; 9,406,419; 9,404,954; 9,401,439; 9,397, 524; 9,396,867; 9,384,885; 9,369,182; 9,368,965; 9,356, 659; 9,349,523; 9,343,922; 9,318,945; 9,318,922; 9,318, 898; 9,318,257; 9,306,635; 9,299,493; 9,287,788; 9,287, 607; 9,276,437; 9,269,489; 9,246,336; 9,240,270; 9,219, 407; 9,210,751; 9,203,365; 9,190,911; 9,184,662; 9,184, 595; 9,178,369; 9,160,203; 9,143,044; 9,142,965; 9,124, 183; 9,123,467; 9,112,364; 9,112,363; 9,112,362; 9,106, 203; 9,106,083; 9,105,959; 9,101,777; 9,095,729; 9,093, 853; 9,084,335; 9,065,423; 9,065,343; 9,065,286; 9,036, 372; 9,035,499; 8,964,419; 8,963,488; 8,957,549; 8,947, 186; 8,947,047; 8,946,938; 8,937,408; 8,934,269; 8,933, 594; 8,928,276; 8,923,017; 8,922,066; 8,912,687; 8,907, 531; 8,901,881; 8,901,779; 8,901,778; 8,896,264; 8,890, 470; 8,875,086; 8,860,241; 8,847,719; 8,847,548; 8,836, 172; 8,811,039; RE45,069; U.S. Pat. Nos. 8,805,530; 8,796, 945; 8,791,599; 8,773,231; 8,772,973; 8,772,972; 8,772, 971; 8,766,485; 8,760,008; 8,760,007; 8,729,737; 8,723, 366; 8,716,903; 8,705,252; 8,693,213; 8,692,412; 8,692, 410; 8,686,598; 8,686,333; 8,674,551; 8,669,676; 8,667, 452; 8,648,686; 8,643,326; 8,629,654; 8,629,652; 8,629, 578; 8,618,749; 8,618,696; 8,614,901; 8,598,743; 8,587, 155; 8,587,153; 8,569,914; 8,552,592; 8,546,906; 8,520, 409; 8,502,634; 8,497,601; 8,487,480; 8,482,158; 8,476, 788; 8,471,410; 8,466,583; 8,461,722; 8,461,721; 8,461, 720; 8,461,719; 8,446,744; 8,441,154; 8,410,636; 8,406, 017; 8,400,024; 8,400,023; 8,400,022; 8,400,021; 8,400, 020; 8,400,019; 8,400,018; 8,400,017; 8,395,283; 8,395, 282; 8,391,031; 8,363,427; 8,362,651; 8,350,540; 8,350, 538; 8,339,817; 8,339,812; 8,324,759; 8,314,375; 8,304, 935; 8,222,827; 8,169,185; 8,134,351; 8,120,457; 8,106, 539; 8,097,983; 8,084,889; 8,076,801; 8,076,800; 8,035, 255; 8,031,042; 8,022,576; 7,952,322; 7,948,208; 7,915, 874; 7,889,477; 7,876,067; 7,843,708; 7,825,543; 7,821, 799; 7,817,452; 7,778,046; 7,767,941; 7,760,517; 7,746, 669; 7,742,318; 7,741,734; 7,656,686; 7,652,231; 7,448, 109; 7,447,048; 7,423,887; 7,388,762; 7,388,760; 7,352,

5

596; 7,342,475; 7,339,801; 7,323,964; 7,301,785; 7,285, 875; 7,279,665; 7,269,873; 7,242,595; 7,209,369; 7,200, 434; 7,193,868; 7,187,263; 7,174,208; 7,170,761; 7,158, 389; 7,151,963; 7,145,786; 7,136,293; 7,095,629; 7,034, 264; 6,984,965; 6,980,074; 6,975,098; 6,952,355; 6,934, 166; 6,934,165; 6,930,893; 6,911,848; RE38,547; U.S. Pat. Nos. 6,683,286; 6,670,590; 6,633,138; 6,567,281; 6,563, 096; 6,529,363; 6,507,501; 6,504,423; 6,493,242; 6,469, 469; 6,462,962; 6,400,579; 6,388,896; 6,376,993; 6,370, 043; 6,366,474; 6,343,021; 6,323,627; 6,320,765; 6,317, 337; 6,316,881; 6,304,460; 6,301,128; 6,288,378; 6,272, 025; 6,211,498; 6,181,079; 6,181,077; 6,154,111; 6,124, 581; 6,111,368; 6,108,216; 6,100,663; 6,032,076; 6,018, 468; 5,990,776; 5,886,516; 5,859,771; 5,748,013; 5,737, 203; 5,712,772; 5,712,771; 5,694,304; 5,680,301; 5,644, 184; 5,608,771; 5,582,348; 5,568,017; 5,561,349; 5,540, 384; 5,485,362; 5,453,923; 5,450,305; 5,434,768; 5,409, 163; 5,396,410; 5,349,514; 5,341,280; 5,341,083; 5,325, 283; 5,301,096; 5,293,308; 5,267,133; 5,249,113; 5,239, 251; 5,235,501; 5,208,738; 5,207,208; 5,177,675; 5,157, 593; 5,157,319; 5,131,376; 5,126,931; 5,073,849; 5,066, 900; 5,028,804; 4,994,684; 4,982,147; 4,980,611; 4,959, 764; 4,916,362; 4,864,479; 4,805,081; 4,774,649; 4,769, 754; and 4,571,667.

SUMMARY OF THE INVENTION

In Electric Vehicles (EVs) and forklift battery chargers, there is a great demand for high power density and efficient bidirectional AC to DC power electronics converter owing to alleviate the fuel consumption. In these applications, the power converter is connected to the grid and the battery is connected to the DC output of the converter with a high-voltage DC link connecting AC to DC and DC to DC converter. Commonly, the DC link voltage goes to >700V and DC output voltage typically varies from 25V-55V for a nominal 48V lead-acid battery following the State of Charge (SOC) of the battery. Therefore, inherently the converter requires a high step-down voltage conversion. A CLLC resonant converter is the best suited for this kind of application. As in this resonant converter, the magnetic element (i.e., inductors and transformers) is an integral part of the system, a reduced volume, and efficient magnetic design is desired to achieve high power density and an efficient resonant power converter. To achieve these essential requirements, a planar magnetic structure operating at hundreds of kilohertz frequency with interleaving windings layout is well studied in the recent past. Reason being to have slim profile converters and providing proper thermal behavior due to the planar transformer's low height and low thermal resistance. Nevertheless, all these magnetic arrangements are limited to certain design specifications (i.e., turns ratio, resonant inductance, voltage, and current levels).

An integrated planar magnetics arrangement for an AC to DC bidirectional CLLC resonant converter is provided which is not limited to any design specifications and offers several other advantages as compared to the existing magnetic structure.

The present invention provides a planar transformer in which a reluctance path is provided to the flow of leakage flux having optimally sized the two (i.e., right and left) cores to achieve the required inductances. The air gap may be distributed across the core height. Also, multiple smaller length cores may be placed while maintaining certain air gaps (e.g., 1 mm) bring about a reduction in the core strip width. The integrated transformer core may have three cores 205, 207, 209 placed with a calculated air gap 201, 203 between each of them, so that the flux linking through each of these cores 205, 207, 209 is decoupled from one another.

Theoretically, as shown in FIG. 1, in a CLLC bidirectional resonant converter, the magnetic part consists of the resonant inductor Lm 103 and the high-frequency transformer. Usually, these two discrete parts are designed with a ferrite core material 105. According to the present technology an FT-3M material based integrated planar magnetic structure is used, where both primary and secondary side resonant inductors, leakage inductance, and magnetizing inductance of transformer are all integrated into one structure along with printed circuit board (PCB) windings NetP5_1 as shown in FIG. 5A.

The three magnetic cores namely left 205, center 207, and right 209 are arranged with a calculated air gap 201, 203 between each of the cores 205, 207. 209 so that the flux linking through each of these cores is decoupled from one another as shown in FIGS. 4A and 4B. The left core provides a reluctance path to the flow of leakage flux to achieve the desired value of primary side resonant inductance. Similarly, the right core is optimally designed to achieve the desired value of secondary-side resonant inductance, while the center core mainly carries the main flux to meet the magnetizing inductance of the proposed integrated transformer.

For high frequency CLLC resonant converters, gapped planar transformers are being used to avoid saturation and obtain the precise inductance value to achieve soft switching in the converter. However, the gap mainly creates the fringing fluxes, inducing extra magnetic losses in the core surfaces near the air gap. While the air gap is a necessary evil in the magnetic design, a solution is provided according to the present technology to reduce the fringing losses. As shown in FIGS. 2B and 3, by distributing the air gap across the core 205, 207, 209 height primarily, the fringing fluxes surrounding the gaps 205, 207, 209 can be reduced. Furthermore, by having multiple smaller length core segments 211, 213, 221, 223, 225, 227, 229, 231, 233, and combining them while maintaining certain gaps 215, 235, 237, 239, 241 (e.g., 1 mm) the core 211, 213, 221, 223, 225, 227, 229, 231, 233 strip width can be effectively reduced as shown in FIGS. 2B and 3. In so doing, fringing losses are essentially reduced. A laboratory prototype of the nano-crystalline magnetic core elements is shown in FIGS. 5A and 5B.

The design may be used as a high-frequency transformer used in a medium power AC to DC bidirectional converter for EV Charging, energy storage applications, more electric aircraft, in forklift battery chargers, etc.

The design can achieve any required inductance without making any compromise in the design (i.e., turn's ratio) of the transformer. In effect, it reduces the winding and core losses in the transformer. Both fringing fluxes and eddy current surrounding the gaps and through the core width are reduced. This essentially reduces eddy current and fringing losses. An overall high power density and efficient magnetic arrangements can be achieved.

A reluctance path is provided to the flow of leakage flux having optimally sized the two (i.e., right and left) cores to achieve the required inductances.

EMI of the magnetic components is reduced due to better confinement of this flux in the auxiliary cores, and elimination of copper losses in AC inductors and integration of resonant inductors of certain values for CLLC tank using conventional cores shapes.

Any required primary and secondary side inductances can be achieved without making any compromise in the design (i.e., turn's ratio, soft switching) of the converter.

The air gap is preferably distributed across the core height. Also, multiple smaller length cores, e.g., 221, 223, 235, are placed while maintaining certain air gaps, e.g., gaps 235, 237, (e.g., 1 mm) to bring about a reduction in the core strip width. By doing this, fringing fluxes and eddy current surrounding the gaps are reduced and through the core width respectively. This essentially reduces eddy current and fringing losses.

An integrated transformer core is proposed having three cores 205, 207, 209 placed with a calculated air gap 201, 203 between each of them, so that the flux linking through each of these cores 205, 207, 209 is lightly coupled from one another. An overall high power density and efficient magnetic arrangements can be achieved.

Integration of primary and secondary side resonant inductors with the high frequency transformer result in overall reduced size and higher power density.

An optimized winding arrangement to reduce AC and DC copper loss is provided.

With higher saturation flux density (typically 1-1.1 T) and low power loss density (280 kW/m³ at 100 KHz frequency and 0.2 T flux density) of the nano-crystalline core, the effective core structure has reduced in size with an efficient magnetic arrangements.

The present technology provides an approach to integrate independent inductors within an HF transformer without increasing the leakage flux. It reduces the reluctance of the leakage flux path in a controlled manner in the two windings of the HF transformer by introducing additional magnetic cores, typically conventional U-I cores of different geometries on the windings, an example of which is depicted in FIG. 3.

The air gaps between the auxiliary and the transformer cores can be introduced so that the coupling of magnetic flux from each core is significantly reduced. The advantages are reduced EMI of the magnetic components due to better confinement of this flux in the auxiliary cores, and elimination of copper losses in AC inductors and integration of resonant inductors of certain values for the CLLC tank using conventional cores shapes.

A two-step design approach was employed. In first step, the resonant inductors (i.e., primary and secondary) were designed, and the turn's ratio of the HF transformer for a given operating power and voltage levels (i.e., output and input) determined to achieve soft switching in all the semiconductor devices across different loading conditions.

In second step, the HF transformer was laid out with the arrangements as shown in FIG. 5A to achieve the desired primary and secondary side resonant inductances.

If a traditional design approach were employed, the leakage inductance obtained from the leakage flux is limiting to form the primary and secondary resonant inductances. That, in turn, constrains the converter, especially when a high step-up/step-down conversion is required with accompanying large difference between primary and secondary inductances. In effect, these constraints may impair or prevent availability of soft switching in devices across various voltage and loading conditions.

Moreover, to achieve these two significantly varied inductances in a conventional high frequency transformer core, either multiple turns at the high current/low voltage side (where one turn could be a more efficient choice) should be used, or a larger core area is needed to realize the required inductance. That eventually increases the copper loss, or core loss, depending on the above-mentioned designs in the transformer. With the magnetic arrangements according to the present technology, a single turn can be used without increasing the core area at the high current/low voltage side, and in effect a more efficient high frequency transformer with reduced copper and core losses is provided.

It is therefore an object to provide a transformer for a power converter, comprising: a first auxiliary subcore 205, a central subcore 207, and a second auxiliary subcore 209, each respective subcore comprising a lower plate 271, 273, 275, at least one pair of central spacers 277, 278, 279, 280, 281, 282, and an upper plate 283, 285, 287, the lower plate 271, 273, 275, at least one pair of central spacers 277, 279, 281, and the upper plate 283, 285, 287 of each subcore, being respectively separated by a gap 247, 249, 251, 253, 255, 257; the first auxiliary subcore 205 and the central subcore 285 being separated by a gap 201; the second auxiliary subcore 209 and the central subcore 207 being separated by a gap 203; a primary coil 261, encircling a first spacer 278 of the first auxiliary subcore 206 and a first spacer 279 of the central subcore 205; and a secondary coil 263, encircling a second spacer 281 of the second auxiliary subcore 209 and a second spacer 281 of the central subcore 207.

It is also an object to provide a transformer for a power converter, comprising: a first auxiliary subcore, a central subcore, and a second auxiliary subcore, each respective subcore comprising a plurality of segments forming a disjoint loop, separated by a plurality of gaps; the first auxiliary subcore, the central subcore, and the second auxiliary subcore each being separated by a respective gap to decouple respective fluxes in each subcore; a primary coil, encircling a portion of the first auxiliary subcore and a first portion of the central subcore; and a secondary coil, encircling a portion of the second auxiliary subcore and a second portion of the central subcore, wherein the primary subcore and secondary subcore each provide a reluctance path to a flow of leakage flux, and the center core mainly carries a flux to meet a magnetizing inductance of the transformer.

It is a further object to provide a multicore transformer, comprising: a first auxiliary subcore, a central subcore, and a second auxiliary subcore, each respective subcore comprising a magnetically permeable material; the first auxiliary subcore and the central subcore being separated by a respective gap to decouple respective a first auxiliary subcore flux and the central subcore flux; the second auxiliary subcore and the central subcore being separated by a respective gap to decouple respective a second auxiliary subcore flux and the central subcore flux; the first auxiliary subcore and the second auxiliary subcore being separated by the central subcore; a primary coil, encircling a portion of the first auxiliary subcore and a first portion of the central subcore; and a secondary coil, encircling a portion of the second auxiliary subcore and a second portion of the central subcore, wherein the first auxiliary subcore provides a reluctance path to a flow of leakage flux to achieve a primary side resonant inductance, the secondary auxiliary subcore provides a reluctance path to a flow of leakage flux to achieve a secondary side resonant inductance, and the center core carries a main flux to meet a magnetizing inductance of the transformer, such that the primary side resonant inductance is defined independently of the secondary side resonant inductance.

It is another object to provide a method of inductively transferring power, comprising: providing a first auxiliary subcore, a central subcore, and a second auxiliary subcore, each respective subcore comprising a magnetically permeable material, each respective subcore being separated by a respective flux-decoupling gap, having a primary coil encircling a portion of the first auxiliary subcore and a first portion of the central subcore and a secondary coil encircling a portion of the second auxiliary subcore and a second portion of the central subcore, to thereby define a multicore transformer, exciting the primary coil to supply a magnetizing flux of the multicore transformer at an excitation frequency; and transferring, the magnetizing flux to the secondary coil, to thereby generate an electrical current in the secondary coil at the excitation frequency, wherein the first auxiliary subcore provides a reluctance path to a flow of leakage flux to achieve a primary side resonant inductance, the secondary auxiliary subcore provides a reluctance path to a flow of leakage flux to achieve a secondary side resonant inductance, and the center core carries a main flux to meet the magnetizing inductance of the transformer, such that the primary side resonant inductance is defined independently of the secondary side resonant inductance.

The primary 261 coil and the secondary 263 coil may each be configured to produce a central magnetic field having an axis 289 intersecting the lower plate 273 and the upper plate 275 of the central subcore 207.

Each subcore may be split along the axis 289 by at least one 239, 241 or at least two gaps 235, 237, e.g., 1, 2, 3, 4, 5, 6, 7, 8, 9, 10, etc., gaps.

Each central spacer may be split along the axis 289 by at least one gap 239 e.g., 1, 2, 3, 4, 5, 6, 7, 8, 9, 10, etc., gaps.

Each subcore may be split along the axis 289 by at least one gap, and each subcore may have the same number of vertical gaps.

The first auxiliary subcore, central subcore, and second auxiliary subcore may be configured with a respective gap between the first auxiliary subcore and the central subcore, and the central core and the second auxiliary subcore, so that magnetic flux linking adjacent subcores is decoupled. The first auxiliary subcore may be configured to provide a reluctance path to a flow of leakage flux to achieve a desired value of a first side inductance. The second auxiliary subcore may be configured to provide a desired value of a secondary-side inductance. The center subcore may be configured to carry a main flux to meet a magnetizing inductance to transfer power between the first side to the second side.

It is another object to provide a method of inductively transferring power, comprising: providing a first auxiliary subcore, a central subcore, and a second auxiliary subcore, each respective subcore comprising a magnetically permeable material, each respective subcore being separated by a respective flux-decoupling gap, having a primary coil encircling a portion of the first auxiliary subcore and a first portion of the central subcore and a secondary coil encircling a portion of the second auxiliary subcore and a second portion of the central subcore, to thereby define a multicore transformer, exciting the primary coil to supply a magnetizing flux of the multicore transformer at an excitation frequency; and transferring the magnetizing flux to the secondary coil, to thereby generate an electrical current in the secondary coil at the excitation frequency, wherein the first auxiliary subcore provides a reluctance path to a flow of leakage flux to achieve a primary side resonant inductance, the secondary auxiliary subcore provides a reluctance path to a flow of leakage flux to achieve a secondary side resonant inductance, and the center core carries a main flux to meet the magnetizing inductance of the transformer, such that the primary side resonant inductance is defined independently of the secondary side resonant inductance.

A further object provides a multicore transformer, comprising: a first pair of magnetically permeable plates, separated by a first set of segmented magnetically permeable spacers defining a first auxiliary subcore to a first magnetically coupled path; a second pair of magnetically permeable plates, separated by second set of segmented magnetically permeable spacers defining a second auxiliary subcore to define a second magnetically coupled path; a third pair of magnetically permeable plates, separated by third and fourth sets of segmented magnetically permeable spacers defining a central subcore to define a third magnetically coupled loop; the first magnetically coupled path, the second magnetically coupled path, and the third magnetically coupled path being sufficiently spaced to be magnetically decoupled; a planar primary coil, surrounding the first set of segmented magnetically permeable spacers and the third set of magnetically permeable segmented spacers, such that a magnetizing flux is induced in the third set of magnetically permeable segmented spacers to meet a magnetizing inductance of the multicore transformer and a first leakage flux is induced in the first set of magnetically permeable segmented spacers to provide a reluctance path to a flow of leakage flux to achieve a primary side resonant inductance; and a planar secondary coil, surrounding the second set of segmented magnetically permeable spacers and the fourth set of magnetically permeable segmented spacers, such that the magnetizing flux in the fourth set of magnetically permeable segmented spacers is coupled to the planar secondary coil, and a second leakage flux is induced in the second set of magnetically permeable segmented spacers to provide a reluctance path to a flow of leakage flux to achieve a secondary side resonant inductance.

A still further object provides a method of designing a transformer, comprising: electromagnetically modelling a transformer comprising: a first auxiliary subcore, a central subcore, and a second auxiliary subcore, each respective subcore comprising a magnetically permeable material, wherein the first auxiliary subcore and the central subcore are separated by a respective gap to decouple respective a first auxiliary subcore flux and the central subcore flux, the second auxiliary subcore and the central subcore are separated by a respective gap to decouple respective a second auxiliary subcore flux and the central subcore flux, and the first auxiliary subcore and the second auxiliary subcore are separated by the central subcore; a primary coil, encircling a portion of the first auxiliary subcore and a first portion of the central subcore; and a secondary coil, encircling a portion of the second auxiliary subcore and a second portion of the central subcore, wherein the first auxiliary subcore provides a reluctance path to a flow of leakage flux to achieve a primary side resonant inductance, the secondary auxiliary subcore provides a reluctance path to a flow of leakage flux to achieve a secondary side resonant inductance, and the center core carries a main flux to meet a magnetizing inductance of the transformer, such that the primary side resonant inductance is defined independently of the secondary side resonant inductance; defining a magnetizing inductance required for the transformer, and constraining the central subcore to supply the magnetizing inductance from the primary coil; defining the primary side resonant inductance, and constraining the first auxiliary subcore to provide the reluctance path to the flow of leakage flux to achieve the primary side resonant inductance from the primary coil; defining the secondary side resonant inductance, and constraining the second auxiliary subcore to provide the reluctance path to the flow of leakage flux to achieve the secondary side resonant inductance from the from the secondary primary coil; and optimizing at least a size, shape, and gap configuration of the first auxiliary subcore, the central subcore, and the second auxiliary subcore in accordance with the model and constraints to meet at least the defined magnetizing inductance, defined primary side resonant inductance, defined secondary side resonant inductance, and a required power transfer capability.

The electromagnetic model may comprise a circuit according to FIGS. 6 and 7, wherein:

$\phi_1$ is the flux covering the reluctance path provided by the first auxiliary subcore including airgaps;

$\phi_2$ is the mutual flux covering the reluctance path shared by a portion of the first auxilliary subcore and a first portion of the central subcore including airgaps;

$\phi_3$ is the flux covering the reluctance path provided by the central subcore including airgaps;

$\phi_4$ is the mutual flux covering the reluctance path shared by a portion of the second auxilliary subcore and a second portion of the central subcore including airgaps;

$\phi_5$ is the flux covering the reluctance path provided by the second auxiliary subcore including airgaps;

$L_{l1}$ and $L_{l2}$ are the primary and secondary side resonant inductances, respectively;

$L_{m1}$ is the magnetizing inductance of the transformer;

$V_1$ and $V_2$ are the voltage excitations at the primary and secondary terminals, respectively;

$i_1$ and $i_2$ are the current entering through the primary and secondary terminals, respectively;

$N_1$ and $N_2$ are the number of primary and secondary turns, respectively, $$\Phi_1 = \frac{N1*i1}{Requ1} - \frac{(N1*i1 + N2*i2)*K}{Requ3} \tag{1}$$

$$\Phi_3 = \frac{(N1*i1 + N2*i2)}{Requ3} \tag{2}$$

$$\Phi_5 = \frac{N2*i2}{Requ1} - \frac{(N1*i1 + N2*i2)*K}{Requ3} \tag{3}$$

$$\Phi_2 = \frac{N1*i1}{R1} - \left\{ \frac{2N1*i1(R1 + R2 + R') - 2*\Phi3*R1*R2}{R1*(R1 + 2R2 + 2R')} \right\} \tag{4}$$

$$\Phi_4 = \frac{N2*i2}{R1} - \left\{ \frac{2N2*i2(R1 + R2 + R') - 2*\Phi3*R1*R2}{R1*(R1 + 2R2 + 2R')} \right\} \tag{5}$$

$$K = \frac{R2}{R1 + 2R2 + 2R'} \tag{6}$$

$$R_{equ1} = \frac{R1*(R1 + 2R2 + 2R')}{R1 + R2 + R'} \tag{7}$$

$$R_{equ3} = \frac{(2R2 + R3)*R1*(R1 + 2R2 + 2R') - 2R1*R2^2}{R1*(R1 + R') + R1*(R2 + R')} \tag{8}$$

$R_{equ1}$ and $R_{equ3}$ are the equivalent reluctances
$K$ is a constant, $$\lambda_1 = N_1*(\Phi_1 + \Phi_3) \tag{9}$$

$$\lambda_2 = N_2*(\Phi_3 + \Phi_5) \tag{10}$$

$$\lambda_1 = \frac{N1^2*i1}{Requ1} + \frac{N1^2*i1}{Requ3}*(1 - K) + \frac{N1*N2}{Requ3}*i2*(1 - K) \tag{11}$$

$$\lambda_2 = \frac{N2^2*i2}{Requ1} + \frac{N2^2*i2}{Requ3}*(1 - K) + \frac{N1*N2}{Requ3}*i1*(1 - K) \tag{12}$$

$$V_1 = \frac{d\lambda1}{dt}(10) \tag{13}$$

$$V_2 = \frac{d\lambda2}{dt}(11) \tag{14}$$

-continued $$\begin{bmatrix} V1 \\ V2 \end{bmatrix} = \begin{bmatrix} Lm1 + Ll1 & Lm1*\left(\frac{N2}{N1}\right) \\ Lm2*\left(\frac{N1}{N2}\right) & Lm2 + Ll2 \end{bmatrix} \begin{bmatrix} \frac{di1}{dt} \\ \frac{di2}{dt} \end{bmatrix} \tag{15}$$

$$L_{11} = \frac{N1^2}{Requ1} \tag{16}$$

$$L_{12} = \frac{N2^2}{Requ1} \tag{17}$$

$$L_{m1} = \frac{N1^2}{Requ3}*(1 - K) \tag{18}$$

$$L_{m2} = \frac{N2^2}{Requ3}*(1 - K) \tag{19}$$

$$\Phi_1 >> \Phi_2 \tag{20}$$

$$\Phi_5 >> \Phi_4. \tag{21}$$

The optimizing may comprise receiving functional criteria for the transformer, and solving the equations of the electromagnetic model to achieve the functional criteria.

It is a further object to provide a transformer for a power converter, comprising:

a central subcore comprising: a central subcore lower plate separated by a gap from at least one gap-separated set of central subcore spacers, and a central subcore upper plate separated by a gap from the at least one gap-separated set of central subcore spacers;

a first auxiliary subcore comprising a first auxiliary subcore lower plate separated by a gap from at least one gap-separated set of first auxiliary subcore spacers separated by at least one gap, and a first auxiliary subcore upper plate separated by a gap from the at least one gap-separated set of first auxiliary subcore spacers;

a second auxiliary subcore comprising a second auxiliary subcore lower plate separated by a gap from at least one gap-separated set of second auxiliary subcore spacers separated by at least one gap, and a second auxiliary subcore upper plate separated by a gap from the at least one gap-separated set of second auxiliary subcore spacers;

the first auxiliary subcore and the central subcore being separated by a gap;

the second auxiliary subcore and the central subcore being separated by a gap;

a primary coil, encircling a first spacer of the first auxiliary subcore and a first spacer of the central subcore; and a secondary coil, encircling a second spacer of the second auxiliary subcore and a second spacer of the central subcore.

The primary coil and the secondary coil may each be configured to produce a central magnetic field having an axis intersecting the lower plate and the upper plate of the central subcore.

The central subcore, the first auxiliary subcore, and second first auxiliary subcore may each be gapped along the axis.

At least one of the central subcore, the first auxiliary subcore, and second first auxiliary subcore may be split along the axis by at least two gaps.

Each of the at least one gap-separated set of central subcore spacers may be split along the axis by at least one gap.

Each of the central subcore, the first auxiliary subcore, and second first auxiliary subcore may be split along the axis by a common number of gaps.

The gap separating the first auxiliary subcore and the central subcore may be configured to decouple a magnetic flux therebetween.

The gap separating the second auxiliary subcore and the central subcore may be configured to decouple a magnetic flux therebetween.

The first auxiliary subcore may be configured to provide a reluctance path to a flow of leakage flux to achieve a value of a first side inductance.

The second auxiliary subcore may be configured to provide a value of a secondary-side inductance.

The center subcore may carry a flux to meet a magnetizing inductance to transfer power between the first side to the second side.

The multicore transformer may be defined as follows:

$\phi_1$ is a flux covering a reluctance path provided by the first auxiliary subcore comprising $R_1$ and $R_2$;

$\phi_2$ is a mutual flux covering a reluctance path shared by a portion of the first auxilliary subcore and a first portion of the central subcore comprising $R_1$, $R_1'$, and $R_4$;

$\phi_3$ is a flux covering a reluctance path provided by the central subcore comprising $R_3$, $R_4$, and $R_5$;

$\phi_4$ is a mutual flux covering a reluctance path shared by a portion of the second auxilliary subcore and a second portion of the central subcore comprising $R_5$, $R_1'$, and $R_6$;

$\phi_5$ is the flux covering the reluctance path provided by the second auxiliary subcore comprising $R_6$ and $R_7$;

$L_{l1}$ is a primary coil resonant inductance;

$L_{l2}$ is a secondary coil resonant inductance;

$L_{m1}$ is a magnetizing inductance of the transformer;

$V_1$ is a voltage excitation of the primary coil;

$V_2$ is a voltage excitation of the secondary coil;

$i_1$ is a current entering through the primary coil;

$i_2$ is a current entering through the secondary coil;

$N_1$ is a number of turns of the primary coil;

$N_2$ is a number of turns of the secondary coil;

$R_{equ1}$=is an equivalent reluctance of the primary coil;

$R_{equ3}$=is an equivalent reluctance of the secondary coil;

such that:

$$\Phi_1 = \frac{N1 * i1}{Requ1} - \frac{(N1 * i1 + N2 * i2) * K}{Requ3}, \tag{1}$$

$$\Phi_3 = \frac{(N1 * i1 + N2 * i2)}{Requ3}, \tag{2}$$

$$\Phi_5 = \frac{N2 * i2}{Requ1} - \frac{(N1 * i1 + N2 * i2) * K}{Requ3}, \tag{3}$$

$$\Phi_2 = \frac{N1 * i1}{R1} - \left\{ \frac{2N1 * i1(R1 + R2 + R') - 2 * \Phi3 * R1 * R2}{R1 * (R1 + 2R2 + 2R')} \right\}, \tag{4}$$

$$\Phi_4 = \frac{N2 * i2}{R1} - \left\{ \frac{2N2 * i2(R1 + R2 + R') - 2 * \Phi3 * R1 * R2}{R1 * (R1 + 2R2 + 2R')} \right\}, \tag{5}$$

$$K = \frac{R2}{R1 + 2R2 + 2R'}, \tag{6}$$

$$R_{equ1} = \frac{R1 * (R1 + 2R2 + 2R')}{R1 + R2 + 2R'}, \tag{7}$$

$$R_{equ3} = \frac{(2R2 + R3) * R1 * (R1 + 2R2 + 2R') - 2R1 * R2^2}{R1 * (R1 + R') + R1 * (R2 + R')}, \tag{8}$$

$$\lambda_1 = N_1 * (\Phi_1 + \Phi_3), \tag{9}$$

-continued $$\lambda_2 = N_2 * (\Phi_3 + \Phi_5), \tag{10}$$

$$\lambda_1 = \frac{N1^2 * i1}{Requ1} + \frac{N1^2 * i1}{Requ3} * (1 - K) + \frac{N1 * N2}{Requ3} * i2 * (1 - K) \tag{11}$$

$$\lambda_2 = \frac{N2^2 * i2}{Requ1} + \frac{N2^2 * i2}{Requ3} * (1 - K) + \frac{N1 * N2}{Requ3} * i1 * (1 - K), \tag{12}$$

$$V_1 = \frac{d\lambda1}{dt}, \tag{13}$$

$$V_2 = \frac{d\lambda2}{dt}, \tag{14}$$

$$\begin{bmatrix} V1 \\ V2 \end{bmatrix} = \begin{bmatrix} Lm1 + Ll1 & Lm1 * \left(\frac{N2}{N1}\right) \\ Lm2 * \left(\frac{N1}{N2}\right) & Lm2 + Ll2 \end{bmatrix} \begin{bmatrix} \frac{di1}{dt} \\ \frac{di2}{dt} \end{bmatrix}, \tag{15}$$

$$L_{11} = \frac{N1^2}{Requ1}, \tag{16}$$

$$L_{12} = \frac{N2^2}{Requ1}, \tag{17}$$

$$L_{m1} = \frac{N1^2}{Requ3} * (1 - K) \tag{18}$$

$$L_{m2} = \frac{N2^2}{Requ3} * (1 - K) \tag{19}$$

$$\Phi_1 \gg \Phi_2, \text{ and} \tag{20}$$

$$\Phi_5 \gg 4. \tag{21}$$

It is a further object to provide a multicore transformer, comprising:

a first auxiliary subcore, a central subcore, and a second auxiliary subcore, each respective subcore comprising a magnetically permeable material;

the first auxiliary subcore and the central subcore being separated by a respective gap to decouple respective a first auxiliary subcore flux and the central subcore flux;

the second auxiliary subcore and the central subcore being separated by a respective gap to decouple respective a second auxiliary subcore flux and the central subcore flux;

the first auxiliary subcore and the second auxiliary subcore being separated by the central subcore;

a primary coil, encircling a portion of the first auxiliary subcore and a first portion of the central subcore; and a secondary coil, encircling a portion of the second auxiliary subcore and a second portion of the central subcore, wherein the first auxiliary subcore provides a reluctance path to a flow of leakage flux to achieve a primary side resonant inductance, the secondary auxiliary subcore provides a reluctance path to a flow of leakage flux to achieve a secondary side resonant inductance, and the center core carries a main flux to meet a magnetizing inductance of the transformer, such that the primary side resonant inductance is defined independently of the secondary side resonant inductance.

Another object provides a method of inductively transferring power, comprising:

providing a first auxiliary subcore, a central subcore, and a second auxiliary subcore, each respective subcore comprising a magnetically permeable material, each respective subcore being separated by a respective flux-decoupling gap, having a primary coil encircling a portion of the first auxiliary subcore and a first portion of the central subcore and a secondary coil encircling a portion of the second auxiliary subcore and a second portion of the central subcore, to thereby define a multicore transformer, exciting the primary coil to supply a magnetizing flux of the multicore transformer at an excitation frequency; and transferring the magnetizing flux to the secondary coil, to thereby generate an electrical current in the secondary coil at the excitation frequency, wherein the first auxiliary subcore provides a reluctance path to a flow of leakage flux to achieve a primary side resonant inductance, the secondary auxiliary subcore provides a reluctance path to a flow of leakage flux to achieve a secondary side resonant inductance, and the center core carries a main flux to meet the magnetizing inductance of the transformer, such that the primary side resonant inductance is defined independently of the secondary side resonant inductance.

The primary coil and the secondary coil may each be configured to produce a central magnetic field having an axis intersecting the lower plate and the upper plate of the central subcore.

Each subcore may be split along the axis by at least one gap.

At least one subcore may be split along the axis by at least two gaps.

Each central spacer may be split along the axis by at least one gap.

Each subcore may be split along the by at least one gap, and each subcore has the same number of vertical gaps.

The first auxiliary subcore, central subcore, and second auxiliary subcore may be configured with a respective gap between the first auxiliary subcore and the central subcore, and the central core and the second auxiliary subcore, so that magnetic flux linking adjacent subcores is decoupled.

The first auxiliary subcore may be configured to provide a reluctance path to a flow of leakage flux to achieve a desired value of a first side inductance.

The second auxiliary subcore may be configured to provide a desired value of a secondary-side inductance.

The center subcore may mainly carry a main flux to meet a magnetizing inductance to transfer power between the first side to the second side.

The method may further comprise:

defining an electromagnetic model of a transformer comprising the first auxiliary subcore, the central subcore, the second auxiliary subcore, the gaps, the primary coil, and the secondary coil;

defining a magnetizing inductance required for the transformer, and constraining the central subcore to supply the magnetizing inductance from the primary coil;

defining the primary side resonant inductance, and constraining the first auxiliary subcore to provide the reluctance path to the flow of leakage flux to achieve the primary side resonant inductance from the primary coil; defining the secondary side resonant inductance, and constraining the second auxiliary subcore to provide the reluctance path to the flow of leakage flux to achieve the secondary side resonant inductance from the from the secondary primary coil; and optimizing at least a size, shape, and gap configuration of the first auxiliary subcore, the central subcore, and the second auxiliary subcore in accordance with the electromagnetic model and constraints to meet at least a defined magnetizing inductance, a defined primary side resonant inductance, a defined secondary side resonant inductance, and a required power transfer capability.

The optimizing may comprise receiving quantitative functional criteria for the transformer, and solving the equations of the electromagnetic model to achieve the quantitative functional criteria.

The first auxiliary subcore may comprise a first pair of magnetically permeable plates, separated by a first set of segmented magnetically permeable spacers defining a first magnetically coupled path.

The second auxiliary subcore may comprise a second pair of magnetically permeable plates, separated by second set of segmented magnetically permeable spacers defining a second magnetically coupled path.

The central subcore may comprise a third pair of magnetically permeable plates, separated by third and fourth sets of segmented magnetically permeable spacers defining a third magnetically coupled path.

The first magnetically coupled path, the second magnetically coupled path, and the third magnetically coupled path may be sufficiently spaced to be respectively magnetically decoupled.

The primary coil may be a planar primary coil, surrounding the first set of segmented magnetically permeable spacers and the third set of magnetically permeable segmented spacers, such that a magnetizing flux is induced in the third set of magnetically permeable segmented spacers to meet a magnetizing inductance of the multicore transformer and a first leakage flux is induced in the first set of magnetically permeable segmented spacers to provide a reluctance path to a flow of leakage flux to achieve a primary side resonant inductance.

The secondary coil may be a planar secondary coil, surrounding the second set of segmented magnetically permeable spacers and the fourth set of magnetically permeable segmented spacers, such that the magnetizing flux in the fourth set of magnetically permeable segmented spacers is coupled to the planar secondary coil, and a second leakage flux is induced in the second set of magnetically permeable segmented spacers to provide a reluctance path to a flow of leakage flux to achieve a secondary side resonant inductance.

BRIEF DESCRIPTION OF THE DRAWINGS

FIG. 4A shows a front view and FIG. 4B shows a trimetric view with the planar windings.

DETAILED DESCRIPTION OF THE PREFERRED EMBODIMENTS

For high frequency CLLC resonant converters, gapped planar transformers are being used to avoid saturation and obtain the precise inductance value to achieve soft switching in the converter. However, the gap mainly creates the fringing fluxes, inducing extra magnetic losses in the core surfaces near to the air gap. Because of the air gap, some fluxes fringe and complete their path through the air. These fringing fluxes strike the core and cause excess magnetic losses in the core, called fringing losses. Also, the fringing field that exists around the air gap results in extra winding losses due to the induced eddy current in the winding.

A large air gap causes a larger reluctance, lower magnetizing inductance, wider space for the windings, and better performance characteristics for the CLLC resonant converters. However, it may also produce higher losses. Essentially, fringing losses are directly proportional to the air gap length and the core strip width. While the air gap is a necessary evil in the magnetic design, the resent technology provides a solution to reduce the fringing losses.

Figure 2B:
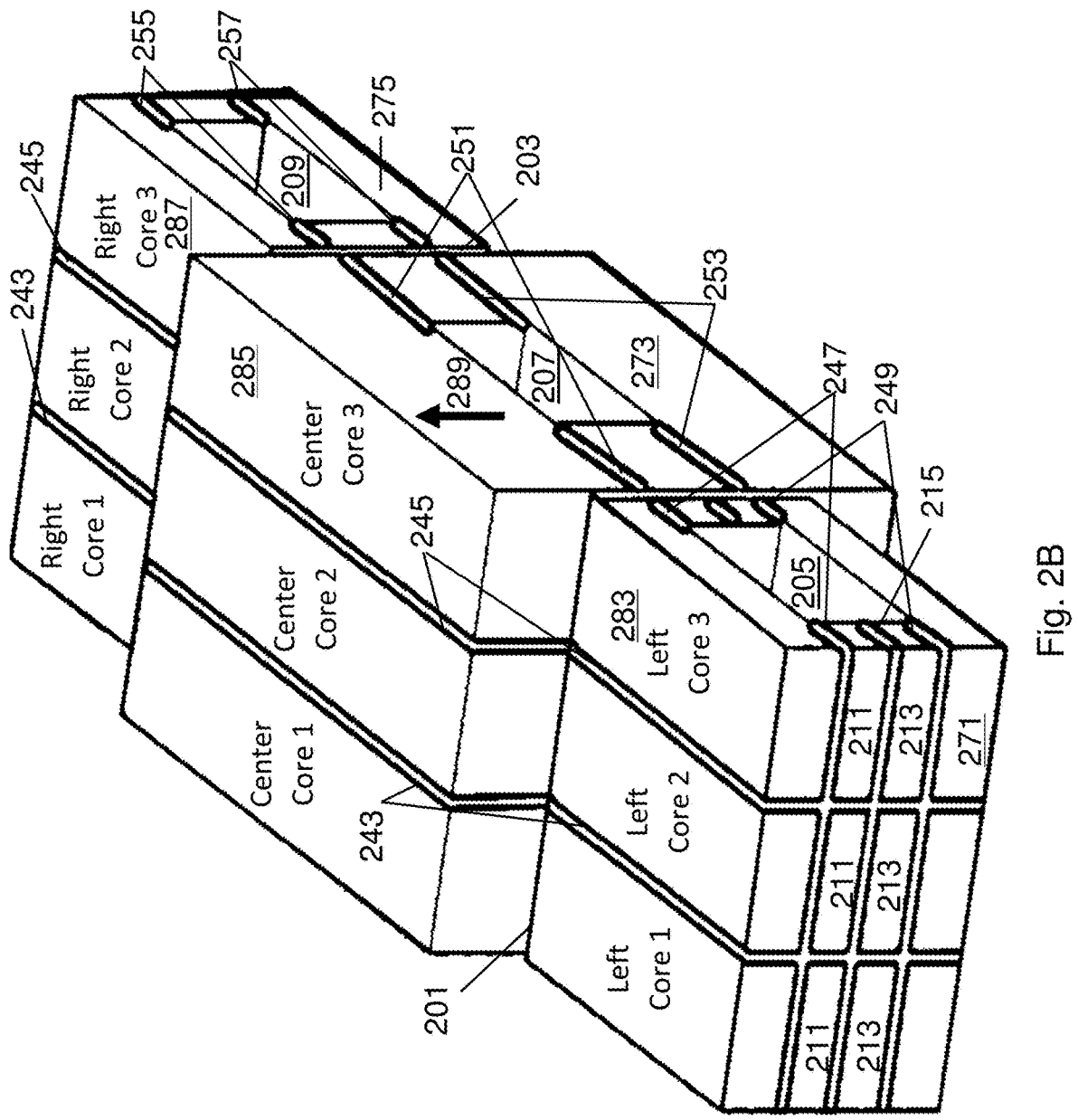
Figure 3:
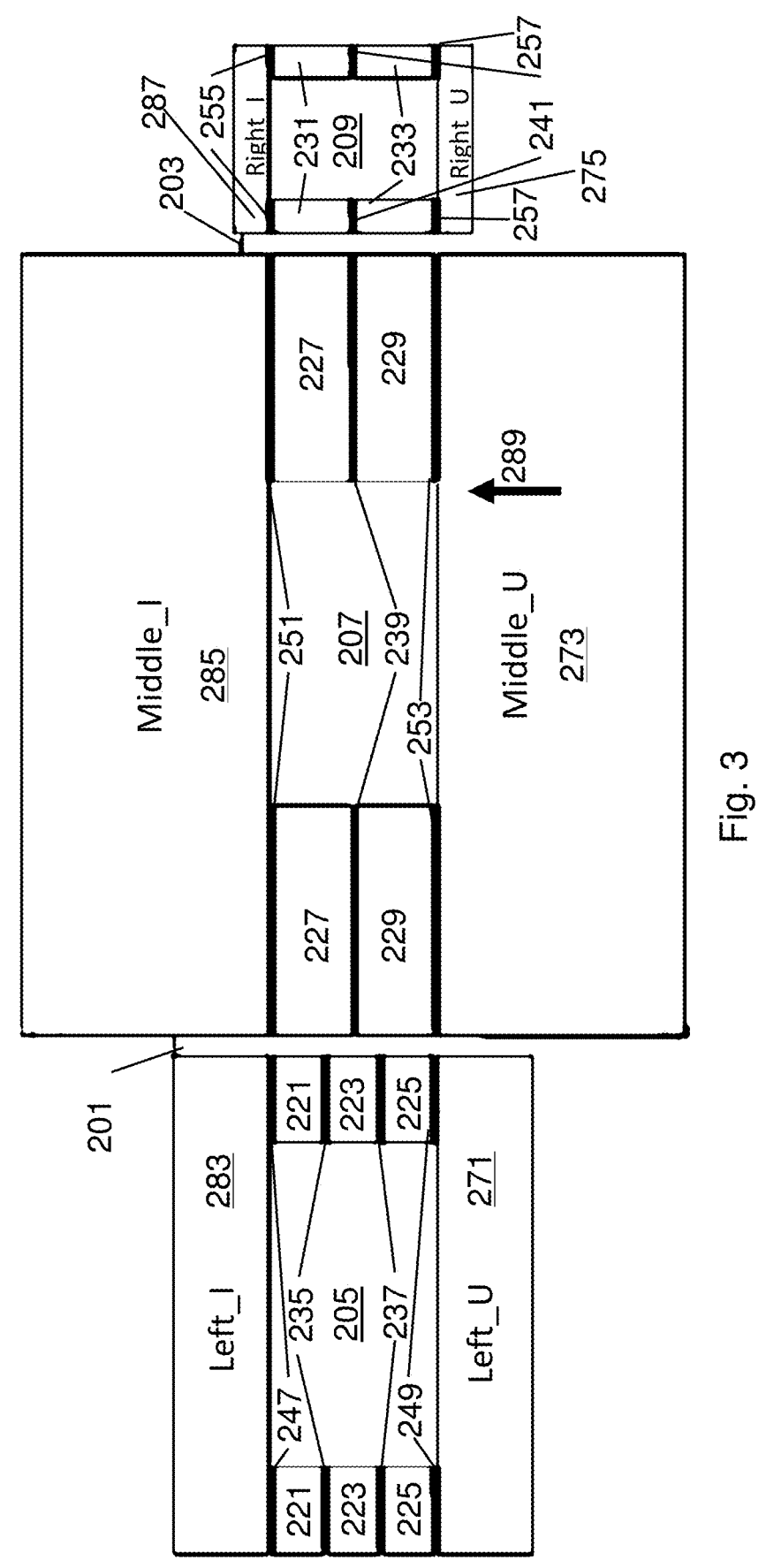
FIG. 3 shows an integrated magnetic design with multiple air gaps across core heights.

As shown in FIG. 3, by distributing the air gap 235, 237, 239, 241 across the core height primarily, the fringing fluxes can be reduced in the surrounding the gaps 201, 203, 243, 245. Furthermore, by having multiple smaller length cores 211, 213, 221, 223, 225, 227, 228, 231, 233 and combining them while maintaining certain clearance (e.g., 1 mm) the core strip width can be effectively reduced as shown in FIG. 2B. Therefore, the fringing losses may be reduced.

Figure 1:
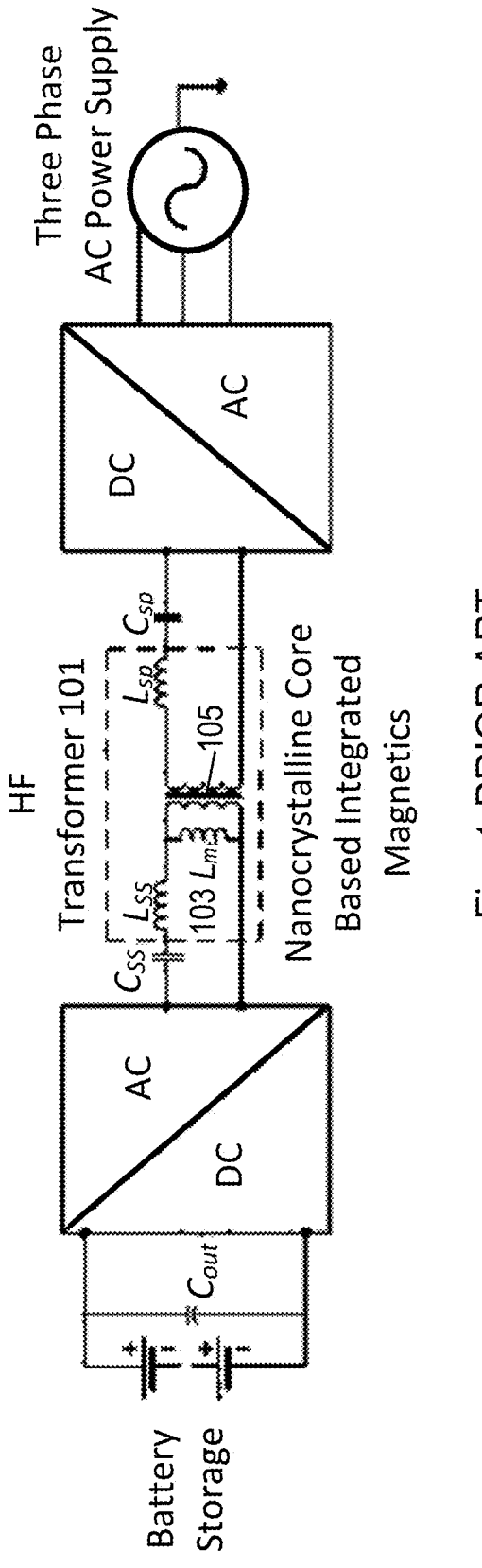
FIG. 1 shows the architecture of a bidirectional AC to DC resonant converter with integrated magnetics, as known in the prior art.
Figure 2A:
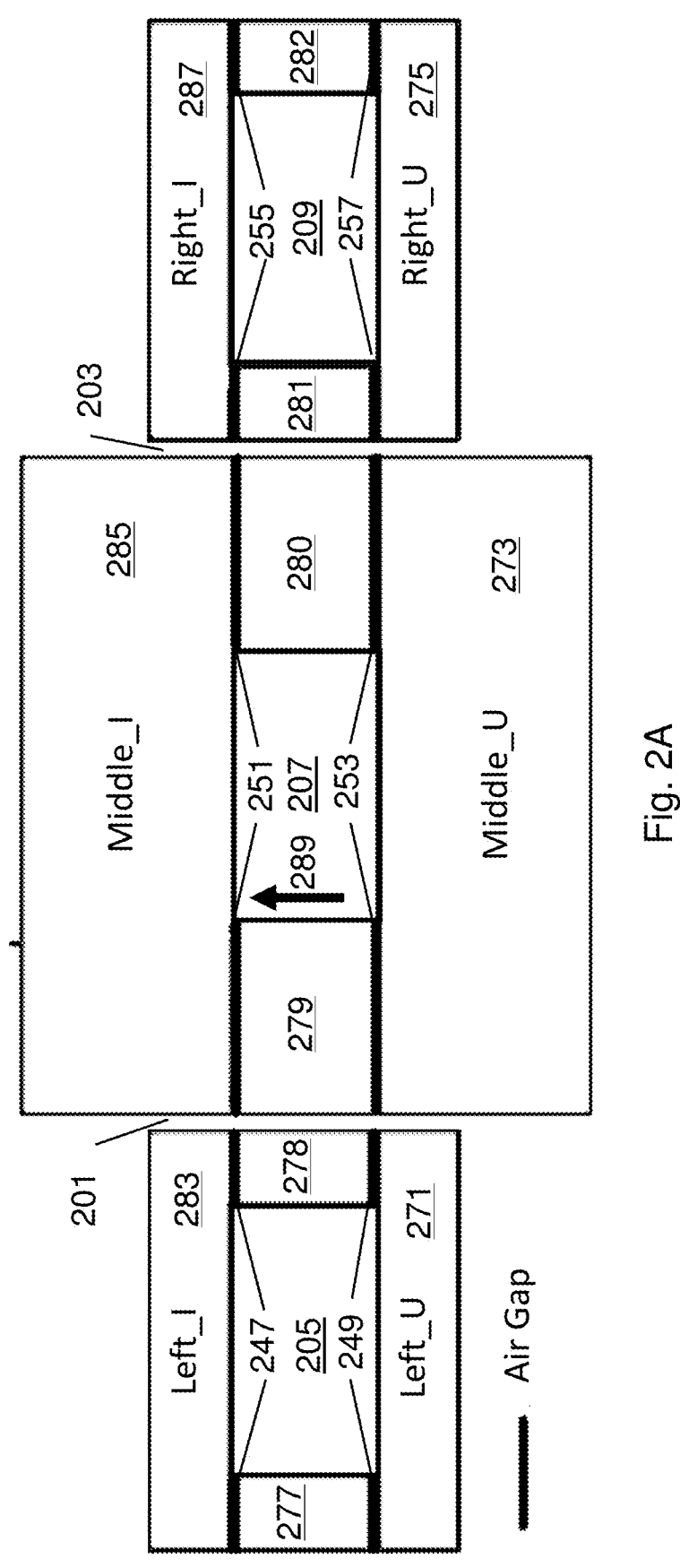
FIGS. 2A and 2B show a magnetic core arrangements with air gaps according to the present invention.
Figure 4A:
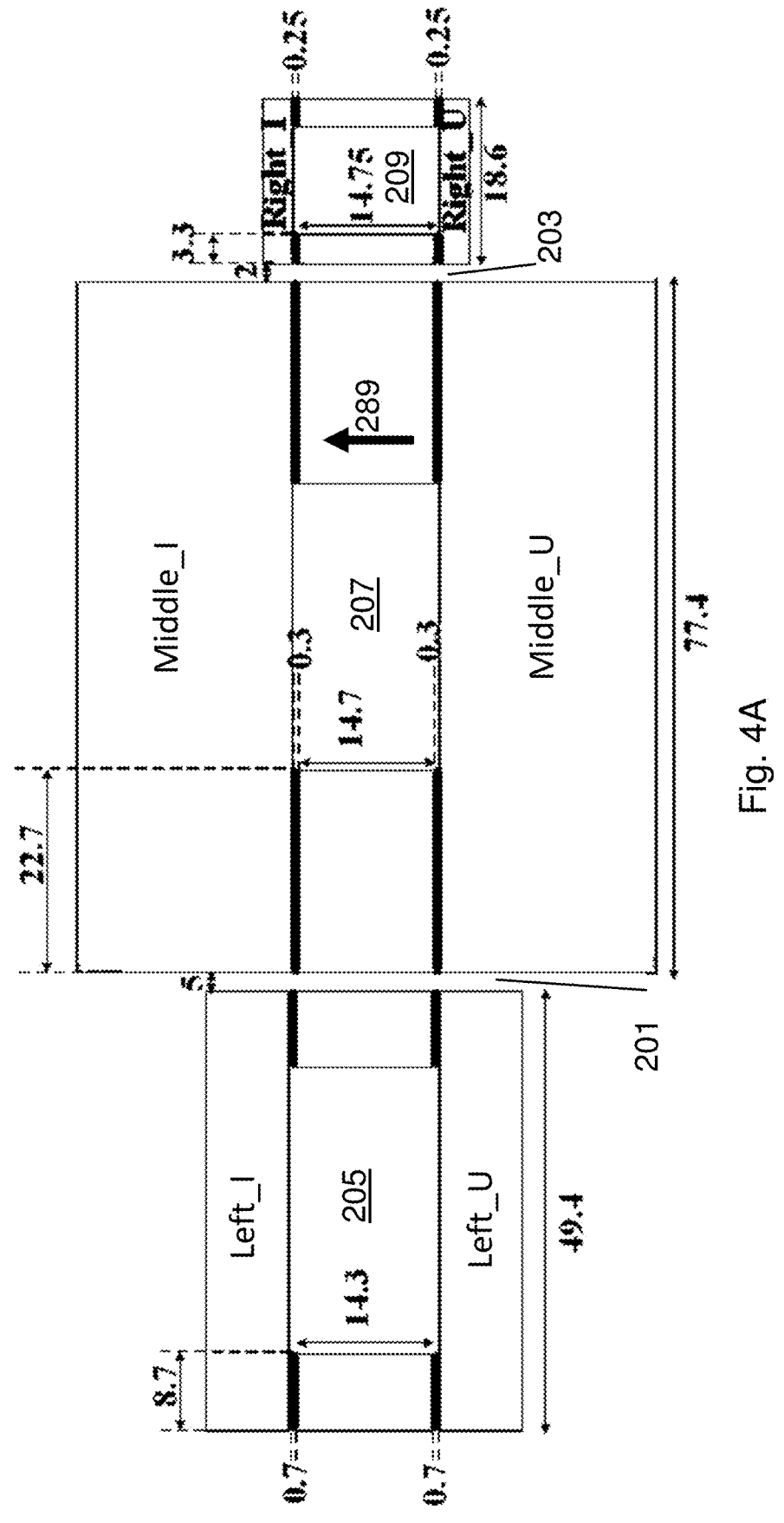
FIGS. 4A and 4B show magnetic design arrangements with their dimensions for a 1300V/45V, 12 kW bidirectional AC to DC resonant converter with integrated magnetics.
Figure 4B:
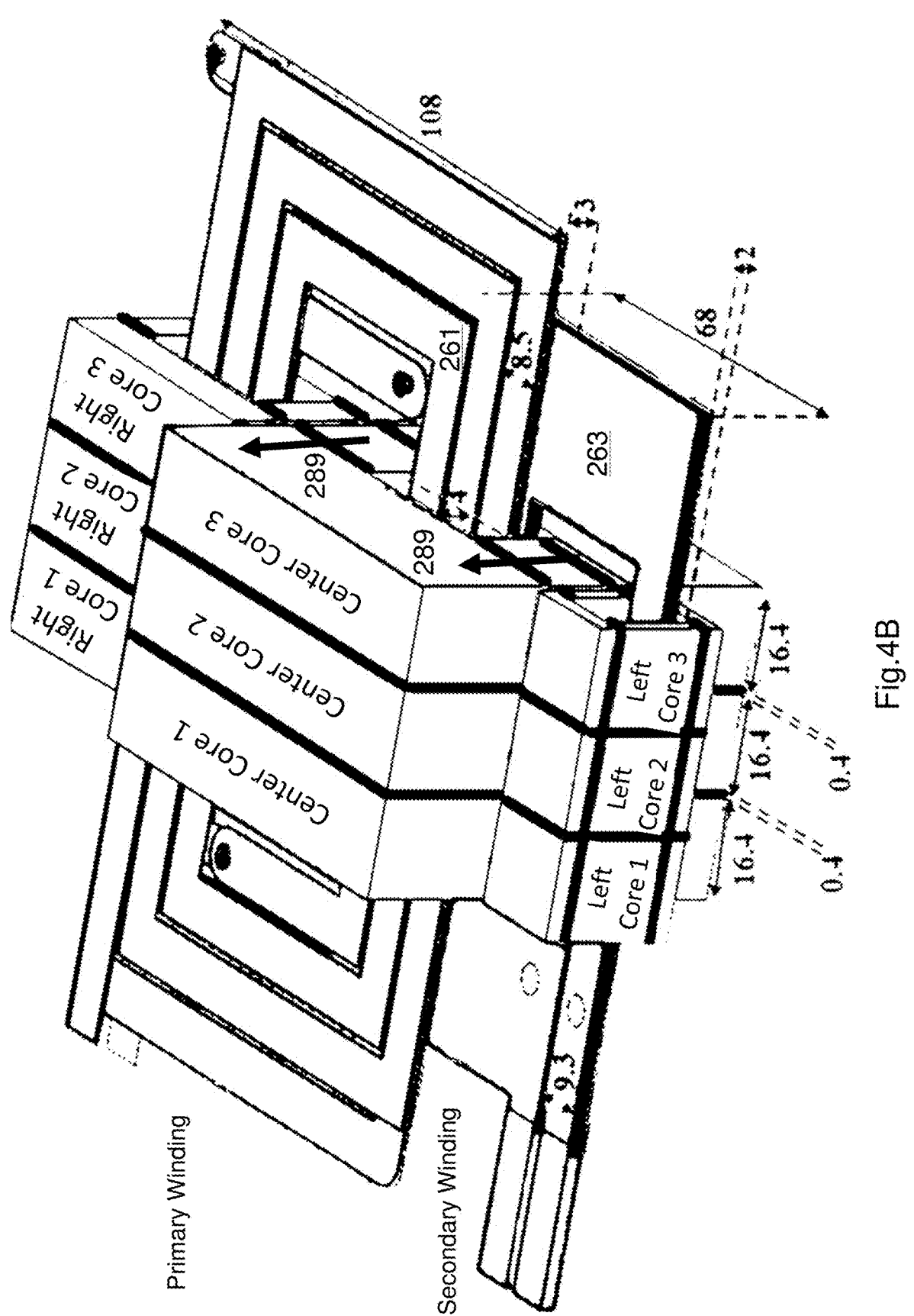

The three magnetic cores 205, 207, 209 shown in FIGS. 2A and 2B, namely left, center and right, are arranged with a calculated air gap 201, 203 between each of the cores, so that the flux linking through each of these cores 205, 207, 209 is very lightly coupled with one another. The left core 205 provides a reluctance path to the flow of leakage flux to achieve a desired value of primary side resonant inductance. Similarly, the right core 209 is optimally designed to achieve a desired value of secondary side resonant inductance, while the center core 207 mainly carries the flux to meet the magnetizing inductance of the integrated transformer.
Magnetic Structure and Winding Layout for a 1300V Input Voltage to 30-60VV Output Voltage, 12 kW CLLC Converter The magnetic core dimensions and arrangements for a 1300V DC input and 30V-60V DC output with a peak power of 12 kW is shown in FIGS. 4A and 4B (dimensions in mm).

FIG. 3 shows three multiple small length magnetic elements 221, 223, 225 assembled for the left side core 205, and two small length magnetic elements 227, 229, 231, 233 each for middle core 207 and right-side core 209, to have significant reduction in fringing loss. However, if the core elements are smaller beyond a certain length, it puts a limit on the manufacturing process.

Therefore, relatively larger magnetic elements are placed for each of the sides (i.e., left 205, middle 207, and right 209), with air gaps on top 247, 251, 255 and bottom 249, 253, 257 that provide fringing loss close to the arrangements shown in FIG. 3. The modified magnetic arrangements of the three cores are shown in FIGS. 4A and 4B, with the planar windings placed as shown in FIG. 4B. Furthermore, the windings on primary 261 and secondary 263 sides are kept at a distance of 4 mm and 2 mm respectively from the air gap of the core, so that the AC loss due to fringing flux can be minimized as shown in FIG. 4A. Also, to reduce proximity effects, both the windings are placed at a distance of 3 mm from each other.

Figure 5A:
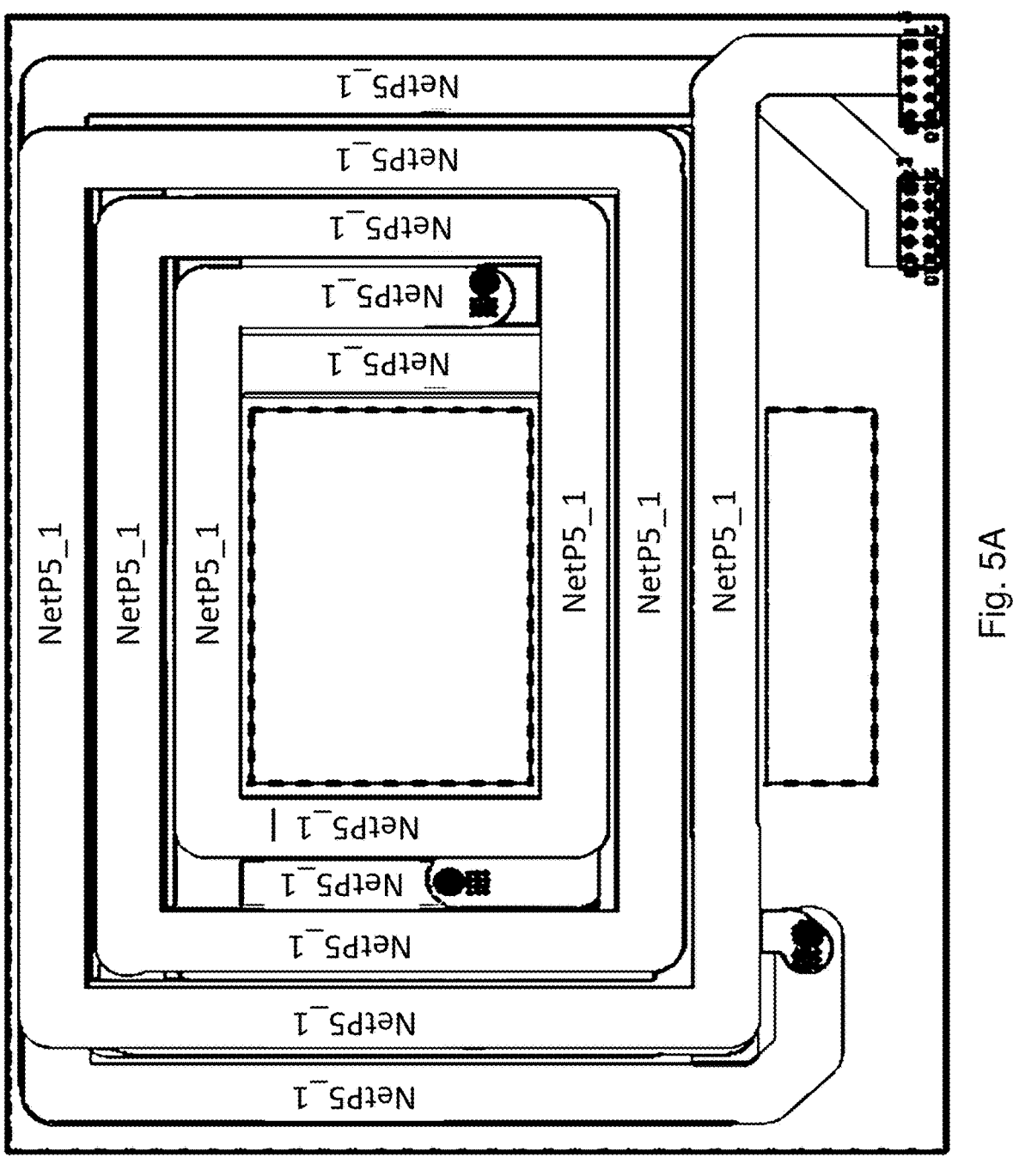
FIG. 5A shows the primary winding planar PCB winding layout.
Figure 5B:
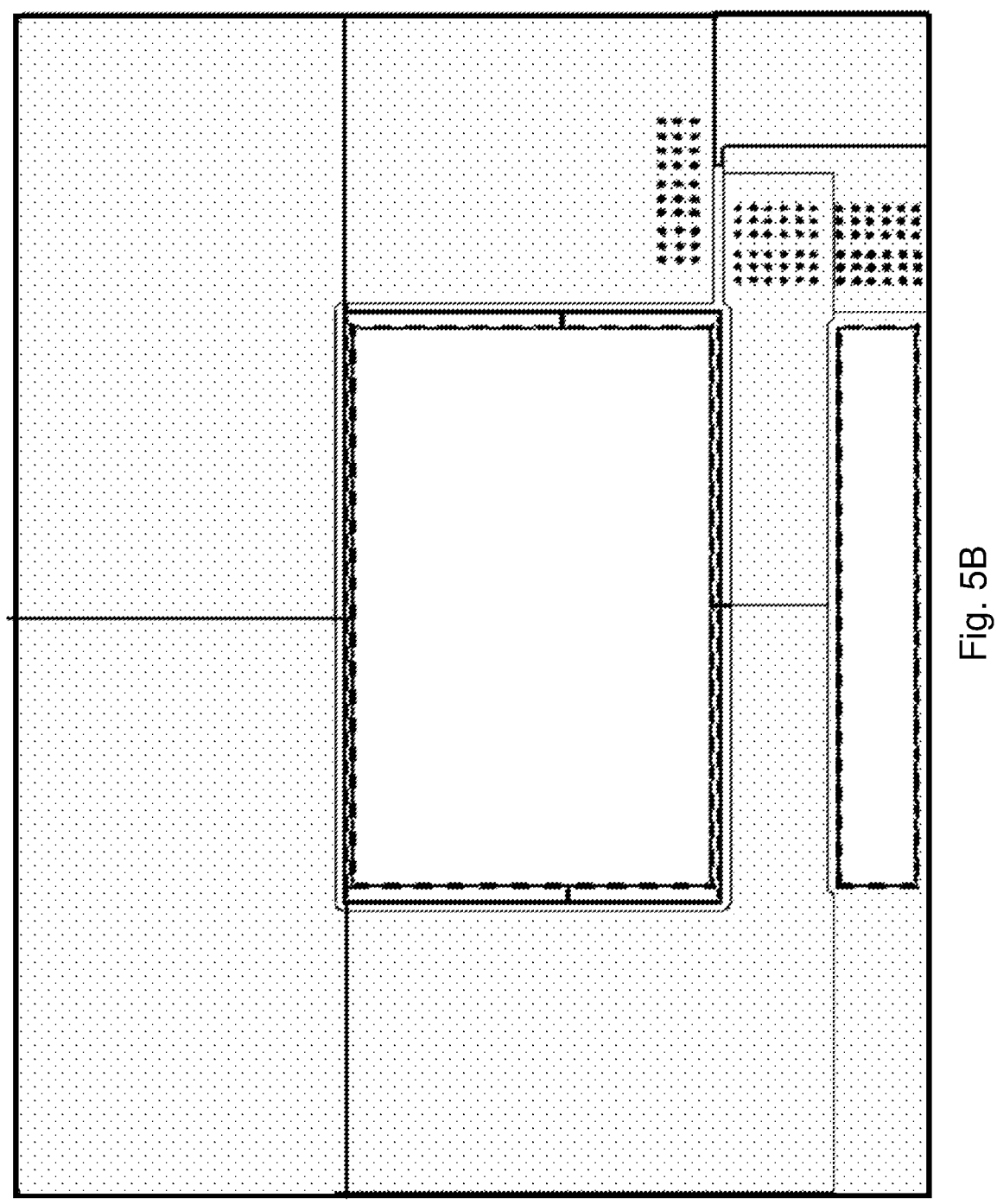
FIG. 5B shows the secondary winding planar PCB winding layout.
Figures 6, 7:
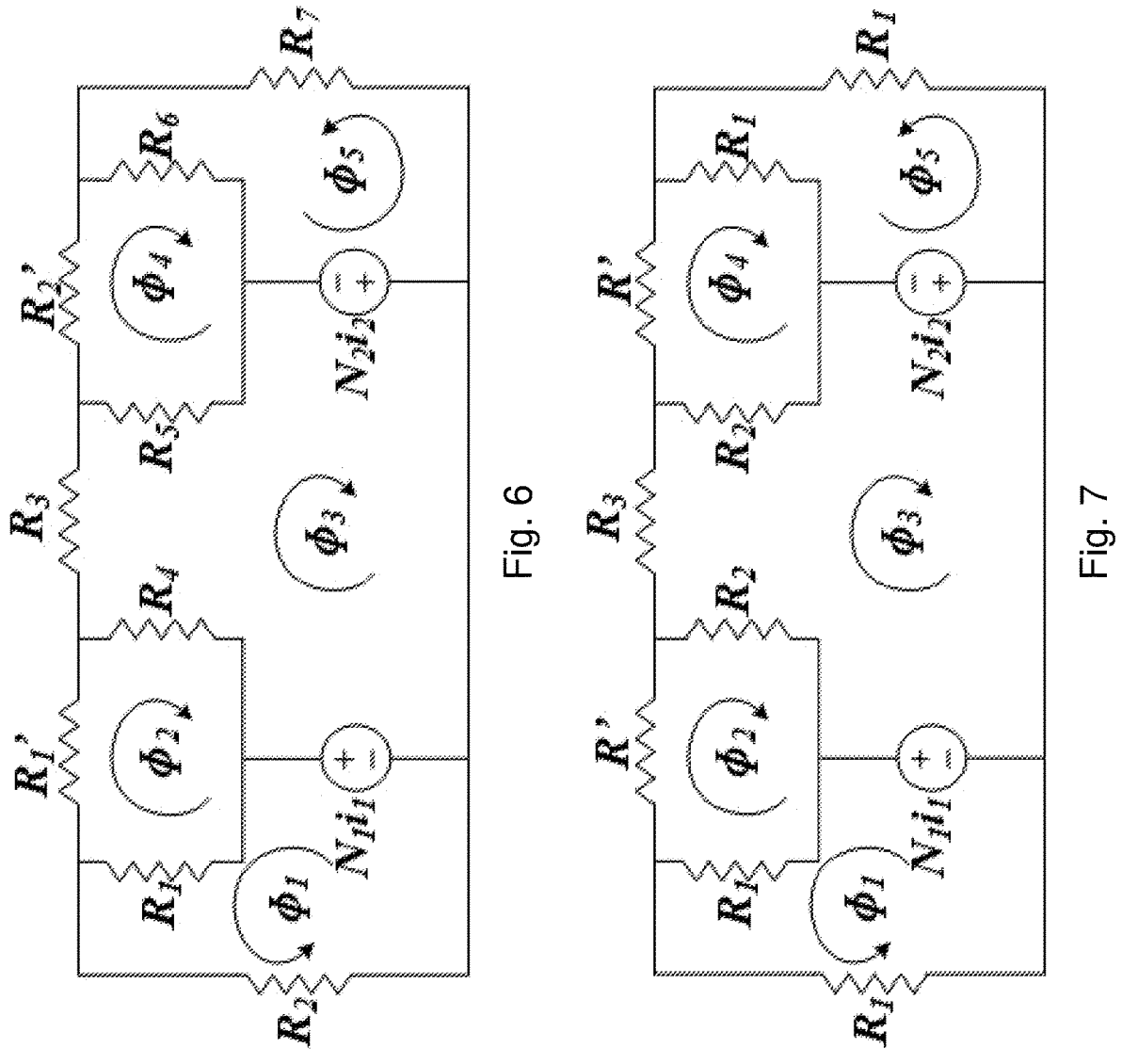
FIG. 6 shows a reluctance network model of the integrated magnetic core structure.
FIG. 7 shows a simplified reluctance network model of the integrated magnetic core structure.

Primary 261 and secondary 263 winding layers are kept on a separate layout over two different limbs of the core. The designed turn's ratio of the planar transformer is 13:1 due to high DC link voltage (1300V) and low DC output voltage (30V-60V). To have a reduced turn on the primary 261 side, only one turn is provided on the secondary 263 side layer. Primary 261 and secondary 263 sides have 6 layer and 10 layer Printed Circuit Boards (PCBs) respectively. The layout of for primary 261 winding is shown in FIG. 5A, and the layout of the secondary 263 winding is shown in FIG. 5B. To mitigate the high insulation requirement at the primary by dint of high voltage, windings are laid on the $2^{nd}$ to $5^{th}$ layers, keeping layer 1 and layer 6 copper-free). Moreover, the winding power loss is proportional to the number of layers in a high-frequency operation. Bearing this in mind, 13 turns are set out in four layers at the primary 261 side with series-connected copper windings. However, as the secondary 263 side has only one turn, to supply the hundreds of ampere current, ten layers are connected in parallel. To reduce the DC resistance, the secondary 263 layers are widened to 68 mm as shown in FIG. 4B.
Modelling of Electrical Circuit and Air Gap Determination for Light Coupling of Three Magnetic Cores The reluctance network for the proposed integrated magnetic structure is shown in FIG. 6. As shown in FIG. 6, $R_4 = R_5$ as the two arms of the middle core have the same length and air gap. Similarly, $R'_1 = R'_2$, $R_1 = R_2$ and $R_6 = R_7$. Also, from FIG. 2A, when $N_1 = N_2$, the two side cores (i.e., left and right) are of equal size and air gaps are the same. The modified reluctance network for FIG. 2A can be drawn as shown in FIG. 7.

Having solved the above reluctance model, the following expressions for the different fluxes are obtained, $\phi_1$ is the flux covering the reluctance path provided by the first auxiliary subcore including airgaps;

$\phi_2$ is the mutual flux covering the reluctance path shared by a portion of the first auxilliary subcore and a first portion of the central subcore including airgaps;

$\phi_3$ is the flux covering the reluctance path provided by the central subcore including airgaps;

$\phi_4$ is the mutual flux covering the reluctance path shared by a portion of the second auxilliary subcore and a second portion of the central subcore including airgaps;

$\phi_5$ is the flux covering the reluctance path provided by the second auxiliary subcore including airgaps.

$L_{l1}$ and $L_{l2}$ are the primary and secondary side resonant inductances, respectively;

$L_{m1}$ is the magnetizing inductance of the transformer;

$V_1$ and $V_2$ are the voltage excitations at the primary and secondary terminals, respectively;

$i_1$ and $i_2$ are the current entering through the primary and secondary terminals, respectively;

$N_1$ and $N_2$ are the number of primary and secondary turns, respectively, $$\Phi_1 = \frac{N1 * i1}{Requ1} - \frac{(N1 * i1 + N2 * i2) * K}{Requ3} \tag{1}$$

$$\Phi_3 = \frac{(N1 * i1 + N2 * i2)}{Requ3} \tag{2}$$

-continued $$\Phi_5 = \frac{N2 * i2}{Requ1} - \frac{(N1 * i1 + N2 * i2) * K}{Requ3} \quad (3)$$

$$\Phi_2 = \frac{N1 * i1}{R1} - \left\{ \frac{2N1 * i1(R1 + R2 + R') - 2 * \Phi3 * R1 * R2}{R1 * (R1 + 2R2 + 2R')} \right\} \quad (4)$$

$$\Phi_4 = \frac{N2 * i2}{R1} - \left\{ \frac{2N2 * i2(R1 + R2 + R') - 2 * \Phi3 * R1 * R2}{R1 * (R1 + 2R2 + 2R')} \right\} \quad (5)$$

$$K = \frac{R2}{R1 + 2R2 + 2R'} \quad (6)$$

$$R_{equ1} = \frac{R1 * (R1 + 2R2 + 2R')}{R1 + R2 + R'} \quad (7)$$

$$R_{equ3} = \frac{(2R2 + R3) * R1 * (R1 + 2R2 + 2R') - 2R1 * R2^2}{R1 * (R1 + R') + R1 * (R2 + R')} \quad (8)$$

$R_{equ1}$ and $R_{equ3}$ are the equivalent reluctances
$K$ is a constant, $$\lambda_1 = N_1 * (\Phi_{1+}\Phi_3) \quad (9)$$

$$\lambda_2 = N_2 * (\Phi_{3+}\Phi_5) \quad (10)$$

Solving equations (1)-(10) yields, $$\lambda_1 = \frac{N1^2 * i1}{Requ1} + \frac{N1^2 * i1}{Requ3} * (1-K) + \frac{N1 * N2}{Requ3} * i2 * (1-K) \quad (11)$$

$$\lambda_2 = \frac{N2^2 * i2}{Requ1} + \frac{N2^2 * i2}{Requ3} * (1-K) + \frac{N1 * N2}{Requ3} * i1 * (1-K) \quad (12)$$

The voltages applied across the two windings can be calculated as, $$V_1 = \frac{d\lambda1}{dt} \quad (13)$$

$$V_2 = \frac{d\lambda2}{dt} \quad (14)$$

Solving equations (11)-(14) the voltages, currents and inductances forms a matrix as follows, $$\begin{bmatrix} V1 \\ V2 \end{bmatrix} = \begin{bmatrix} Lm1 + Ll1 & Lm1 * \left(\frac{N2}{N1}\right) \\ Lm2 * \left(\frac{N1}{N2}\right) & Lm2 + Ll2 \end{bmatrix} \begin{bmatrix} \frac{di1}{dt} \\ \frac{di2}{dt} \end{bmatrix} \quad (15)$$

$$L_{11} = \frac{N1^2}{Requ1} \quad (16)$$

$$L_{12} = \frac{N2^2}{Requ1} \quad (17)$$

$$L_{m1} = \frac{N1^2}{Requ3} * (1-K) \quad (18)$$

$$L_{m2} = \frac{N2^2}{Requ3} * (1-K) \quad (19)$$

-continued

Generally, $$\Phi_1 >> \Phi_2 \quad (20)$$

and $$\Phi_5 >> \Phi_4. \quad (21)$$

In some cases, these limitations do not apply.

Figure 8:
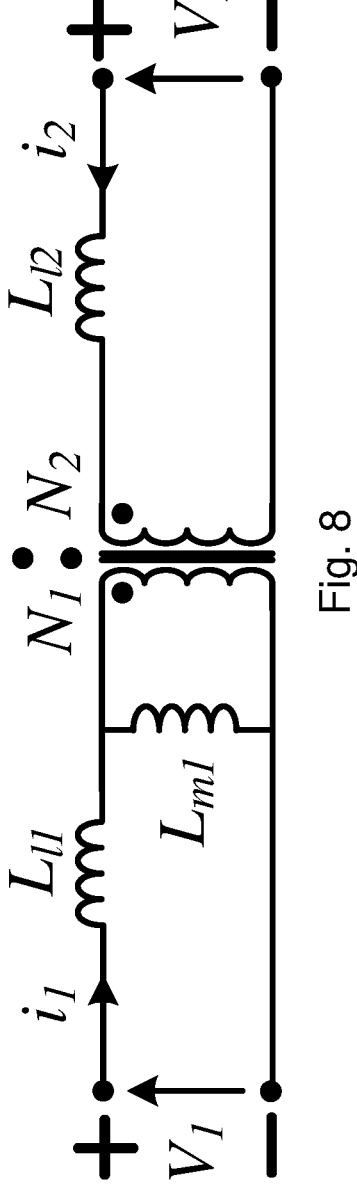
FIG. 8 shows an equivalent electrical circuit diagram of proposed magnetic structure showing different elements.

Therefore, the equivalent electrical circuit diagram of transformer can be drawn as shown in FIG. 8.

Figure 9:
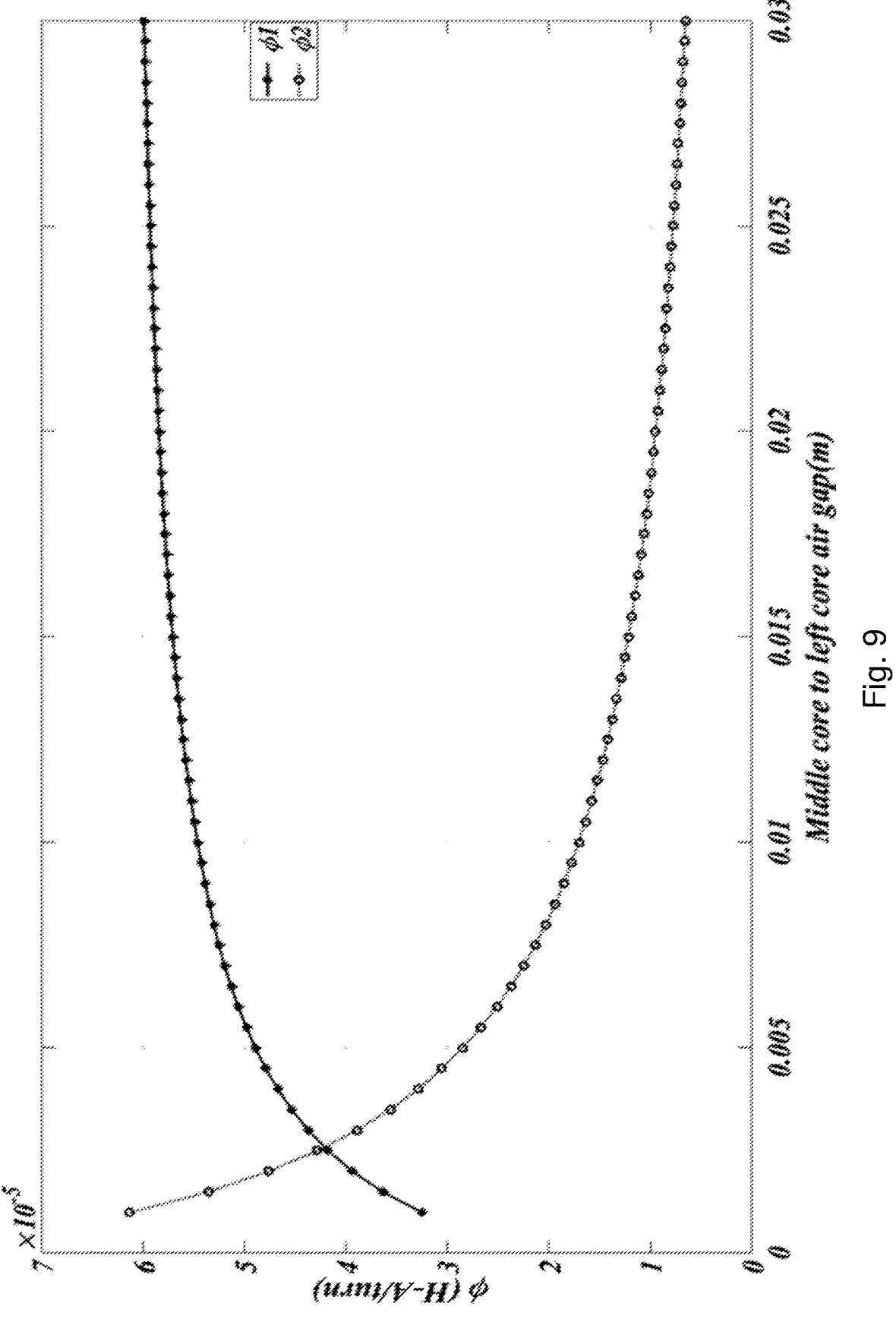
FIG. 9 shows a graph of the variation of flux linkages per turn $\phi_1$ (filled markers, rising) and $\phi_2$ (open markers, declining) with the air gap between middle cores to left cores in meters.

Now, to determine the air gap that needs to be placed among the three magnetic structures, the impact of the air gap clearance on the flux linkages is needed. Hence, to understand it more clearly, the variation of flux linkages per turn $\phi_1$ and $\phi_2$ with the air gap between middle cores to left cores is shown in FIG. 9 for the design shown in FIG. 2A and FIG. 2B. $\phi_3$ doesn't have any variations with the air gap clearance, whereas $\phi_1$ increases and $\phi_2$ decreases with the air gap. To achieve a light coupling, a condition where $\phi_1 >> \phi_2$ should exist. The same holds true for $\phi_4$ and $\phi_5$ (i.e., $\phi_5 >> \phi_4$). From FIG. 9, one can notice for an air gap clearance of 7-8 mm is an optimal to achieve the light coupling.

By following the above approach, for the design shown in FIG. 4A and FIG. 4B, where a high step-down voltage (i.e., 1300V/45V) is required, an air gap 201 (i.e., 5 mm) between left core 205 and middle core 207, and an air gap 203 (i.e., 2 mm) between right core 209 and middle core 207 are set to achieve a light coupling.

Although the invention(s) have been described with reference to specific embodiments, it will be understood by those skilled in the art that various changes may be made, and equivalents may be substituted, for elements thereof without departing from the true spirit and scope of the invention. In addition, modifications may be made without departing from the essential teachings of the invention. The invention is described by way of various embodiments and features. This disclosure is intended to encompass all consistent combinations, subcombinations, and permutations of the different options and features, as if expressly set forth herein individually.

REFERENCES (EACH OF WHICH IS EXPRESSLY INCORPORATED HEREIN BY REFERENCE)

Z. Guo, R. Yu, W. Xu, X. Feng and A. Q. Huang, "Design and Optimization of a 200-kW Medium-Frequency Transformer for Medium Voltage SiC PV Inverters," in *IEEE Transactions on Power Electronics*, doi: 10.1109/TPEL.2021.3059879.

B. Narayanasamy and F. Luo, "A Survey of Active EMI Filters for Conducted EMI Noise Reduction in Power Electronic Converters," in *IEEE Transactions on Electromagnetic Compatibility*, vol. 61, no. 6, pp. 2040-249 December 2019, doi: 10.1109/TEMC.2019.2953055.

F. Luo, B. Narayanasamy and A. Emon, "High Power Density EMI Mitigation in Power Electronics Converters: Active and Integrated Solutions," *CIPS* 2020; 11*th International Conference on Integrated Power Electronics Systems*, Berlin, Germany, 2020, pp. 1-6.

Y. Cai, M. H. Ahmed, Q. Li and F. C. Lee, "Optimized Design of Integrated PCB-Winding Transformer for MHz LLC Converter," 2019 *IEEE Applied Power*

*Electronics Conference and Exposition* (APEC), Anaheim, CA, USA, 2019, pp. 1452-1458, doi: 10.1109/APEC.2019.8722181.

C. Fei, Y. Yang, Q. Li and F. C. Lee, "Shielding Technique for Planar Matrix Transformers to Suppress Common-Mode EMI Noise and Improve Efficiency," in *IEEE Transactions on Industrial Electronics*, vol. 65, no. 2, pp. 1263-1272 February 2018, doi: 10.1109/TIE.2017.2733473.

M. Chen, M. Araghchini, K. K. Afridi, J. H. Lang, C. R. Sullivan and D. J. Perreault, "A Systematic Approach to Modeling Impedances and Current Distribution in Planar Magnetics," in *IEEE Transactions on Power Electronics*, vol. 31, no. 1, pp. 560-580, January 2016, doi: 10.1109/TPEL.2015.2411618.

R. Chattopadhyay, S. Gulur, V. Nair, S. Bhattacharya and P. R. Ohodnicki, "50 kW Nano-Crystalline Core Based Three Port Transformer for Triple Active Bridge Converter," 2019 *IEEE Energy Conversion Congress and Exposition (ECCE)*, 2019, pp. 4167-4173, doi: 10.1109/ECCE.2019.8912172.

B. Cougo and J. W. Kolar, "Integration of Leakage Inductance in Tape Wound Core Transformers for Dual Active Bridge Converters," 2012 *7th International Conference on Integrated Power Electronics Systems (CIPS)*, 2012, pp. 1-6.

M. Meinhardt, M. Duffy, T. O'Donnell, S. O'Reilly, J. Flannery and C. O Mathuna, "New method for integration of resonant inductor and transformer-design, realisation, measurements," *APEC '99. Fourteenth Annual Applied Power Electronics Conference and Exposition. 1999 Conference Proceedings* (Cat. No. 99CH36285), 1999, pp. 1168-1174 vol. 2, doi: 10.1109/APEC.1999.750516.

J. T. Strydom and J. D. van Wyk, "Volumetric limits of planar integrated resonant transformers: a 1 MHz case study," in *IEEE Transactions on Power Electronics*, vol. 18, no. 1, pp. 236-247, January 2003, doi: 10.1109/TPEL.2002.807191.

Y. Wang, G. Calderon-Lopez and A. J. Forsyth, "High-Frequency Gap Losses in Nanocrystalline Cores," in *IEEE Transactions on Power Electronics*, vol. 32, no. 6, pp. 4683-4690 June 2017, doi: 10.1109/TPEL.2016.2594083.

W. Shen, F. Wang, D. Boroyevich and C. W. Tipton, "Loss Characterization and Calculation of Nanocrystalline Cores for High-Frequency Magnetics Applications," in *IEEE Transactions on Power Electronics*, vol. 23, no. 1, pp. 475-484, January 2008, doi: 10.1109/TPEL.2007.911881.

W. A. Roshen, "Fringing Field Formulas and Winding Loss Due to an Air Gap," in *IEEE Transactions on Magnetics*, vol. 43, no. 8, pp. 3387-3394 August 2007, doi: 10.1109/TMAG.2007.898908.

Peng Xu, "Multiphase Voltage Regulator Modules with Magnetic Integration to Power Microprocessors," Ph.D dissertation, Electrical Engineering, Virginia Tech, USA, 2002. Accessed on: Jan. 15, 2002. Available hdl.handle.net/10919/26395.

What is claimed is:

1. A transformer for a power converter, comprising:
a central subcore comprising:
a central subcore lower plate,
a central subcore upper plate, and
first and second magnetically permeable central subcore spacers disposed between the lower plate and the upper plate, wherein:

the lower plate is separated from the first and second magnetically permeable central subcore spacers by first flux decoupling gaps, and the upper plate is separated from the first and second magnetically permeable central subcore spacers by second flux decoupling gaps;

a first auxiliary subcore comprising: a first auxiliary subcore lower plate, a first auxiliary subcore upper plate, and at least one first magnetically permeable auxiliary subcore spacer disposed therebetween and separated by at least one third flux decoupling gap; a second auxiliary subcore comprising:

a second auxiliary subcore lower plate, a second auxiliary subcore upper plate, and at least one second magnetically permeable auxiliary subcore spacer disposed between the second auxiliary subcore lower plate and the second auxiliary subcore upper plate, and being separated by at least one fourth flux decoupling gap;

a fifth flux decoupling gap separating the first auxiliary subcore and the central subcore;

a sixth flux decoupling gap separating the second auxiliary subcore and the central subcore;

a primary coil, encircling the first magnetically permeable auxiliary subcore spacer and the first magnetically permeable central subcore spacer; and a secondary coil, encircling the second magnetically permeable auxiliary subcore spacer and the second magnetically permeable central subcore spacer, wherein the primary coil and the secondary coil have a different number of turns.

2. The transformer according to claim 1, wherein the primary coil and the secondary coil are each configured to produce a central magnetic field having an axis intersecting the lower plate and the upper plate of the central subcore.

3. The transformer according to claim 2, wherein the magnetically permeable central subcore spacer, the first magnetically permeable auxiliary subcore spacer, and second magnetically permeable auxiliary subcore spacer each comprise at least one seventh flux decoupling gap along the axis.

4. The transformer according to claim 2, wherein at least one of the first and second magnetically permeable central subcore spacers, the first magnetically permeable auxiliary subcore spacer, and second magnetically permeable auxiliary subcore spacer is split along the axis by at least two eighth flux decoupling gaps.

5. The transformer according to claim 2, wherein each of the first and second magnetically permeable central subcore spacers is split along the axis by at least one ninth flux decoupling gap.

6. The transformer according to claim 2, wherein each of the first and second magnetically permeable central subcore spacers, the first magnetically permeable auxiliary subcore spacer, and second magnetically permeable auxiliary subcore spacer is split along the axis by a common number of flux decoupling gaps.

7. The transformer according to claim 1, wherein:
the fifth flux decoupling gap separating the first auxiliary subcore and the central subcore is configured to decouple a magnetic flux therebetween;

the sixth flux decoupling gap separating the second auxiliary subcore and the central subcore is configured to decouple a magnetic flux therebetween;

the first auxiliary subcore is configured to provide a reluctance path to a flow of leakage flux to achieve a value of a primary-side inductance;

the second auxiliary subcore is configured to provide a value of a secondary-side inductance; and the center subcore carries a flux to meet a magnetizing inductance to transfer power between the primary side to the secondary side, wherein the first auxiliary subcore and the second auxiliary subcore have different dimensions.

8. The transformer according to claim 1, wherein the primary coil an the secondary coil are printed circuit planar coils.

9. A multicore transformer, comprising:

a first auxiliary subcore comprising a first magnetically permeable material spacer and including a first upper plate, a first lower plate, a first upper flux decoupling gap disposed between the first upper plate and the first magnetically permeable material spacer, and a first lower flux decoupling gap disposed between the first lower plate and the first magnetically permeable material spacer;

a second auxiliary subcore comprising a second magnetically permeable material spacer and including a second upper plate, a second lower plate, a second upper flux decoupling gap disposed between the second upper plate and the second magnetically permeable material spacer, and a second lower flux decoupling gap disposed between the second lower plate and the second magnetically permeable material spacer;

a central subcore comprising a pair of third magnetically permeable material spacers and including a third upper plate, a third lower plate, a third upper flux decoupling gap disposed between the third upper plate and the pair of third magnetically permeable material spacers, and a third lower flux decoupling gap disposed between the third lower plate and the pair of third magnetically permeable material spacers; a first flux decoupling gap, separating the first magnetically permeable spacer of the first auxiliary subcore and a first of the pair of third magnetically permeable material spacers of the central subcore, configured to decouple a first auxiliary subcore flux and a central subcore flux;

a second flux decoupling gap, separating the magnetically permeable spacer of the second auxiliary subcore and a second of the pair of third magnetically permeable material spacers of the central subcore, configured to decouple a second auxiliary subcore flux and the central subcore flux;

the first auxiliary subcore and the second auxiliary subcore being separated by the central subcore;

a primary coil of a primary side, encircling the first magnetically permeable material spacer of the first auxiliary subcore and the first of the pair of third magnetically permeable material spacers of the central subcore; and a secondary coil of a secondary side, encircling the second magnetically permeable material spacer of the second auxiliary subcore and the second of the pair of third magnetically permeable material spacers of the central subcore, wherein:

the primary coil and the secondary coil have different numbers of turns, the first auxiliary subcore provides a reluctance path to a flow of leakage flux to achieve a primary side resonant inductance, the second auxiliary subcore provides a reluctance path to a flow of leakage flux to achieve a secondary side resonant inductance, and the central subcore carries a main flux to meet a magnetizing inductance of the multicore transformer, such that the primary side resonant inductance is defined independently of the secondary side resonant inductance.

10. A system for inductively transferring power, comprising:

a multicore transformer comprising a first auxiliary subcore, a central subcore, and a second auxiliary subcore, the first auxiliary subcore comprising:

a first auxiliary magnetically permeable material portion, a first auxiliary top plate, a first auxiliary bottom plate, a first auxiliary top plate flux decoupling gap between the first auxiliary top plate and the first auxiliary magnetically permeable material portion, and a first auxiliary bottom plate flux decoupling gap between the first auxiliary bottom plate and the first auxiliary magnetically permeable material portion;

the second auxiliary subcore comprising:

a second auxiliary magnetically permeable material portion, a second auxiliary top plate, a second auxiliary bottom plate, a second auxiliary top plate flux decoupling gap between the second auxiliary top plate and the second auxiliary magnetically permeable material portion, and a second auxiliary bottom plate flux decoupling gap between the second auxiliary bottom plate and the second auxiliary magnetically permeable material portion;

the central subcore comprising:

a pair of central magnetically permeable material portions, a central top plate, a central bottom plate, a central top plate flux decoupling gap between the central top plate and the pair of central magnetically permeable material portions, and a central bottom plate flux decoupling gap between the central bottom plate and the pair of central magnetically permeable material portions;

the first auxiliary subcore being separated from the central subcore by a first flux decoupling gap;

the central subcore being separated from the second auxiliary subcore by a second flux decoupling gap;

a primary coil encircling a magnetically permeable material portion of the first auxiliary subcore and a first of the pair of central magnetically permeable material portions; and a secondary coil encircling a magnetically permeable material portion of the second auxiliary subcore and a second of the pair of central magnetically permeable material portions, the primary coil and the secondary coil each having a different number of turns;

wherein the primary coil is configured to be excited to supply a magnetizing flux of the multicore transformer at an excitation frequency; and wherein the secondary coil is configured to receive the magnetizing flux to thereby generate an electrical current in the secondary coil at the excitation frequency, wherein the first auxiliary subcore is configured to provide a reluctance path to a flow of leakage flux to achieve a primary side resonant inductance, wherein the second auxiliary subcore is configured to provide a reluctance path to a flow of leakage flux to achieve a secondary side resonant inductance, and wherein the central subcore is configured to carry a main flux to meet a magnetizing inductance of the multicore transformer, such that the primary side resonant inductance is defined independently of the secondary side resonant inductance.

11. The system according to claim 10, wherein the primary coil and the secondary coil are each configured to produce a central magnetic field having an axis intersecting the lower plate and the upper plate of the central subcore.

12. The system according to claim 11, wherein each of the first auxiliary magnetically permeable material portion, the second auxiliary magnetically permeable material portion, and the pair of central magnetically permeable material portions is split along the axis by at least one flux decoupling gap parallel to at least one of the central top plate and the central bottom plate.

13. The system according to claim 11, wherein at least one of the first auxiliary magnetically permeable material portion, a first of the pair of central magnetically permeable material portions, a second of the pair of central magnetically permeable material portions, and the second auxiliary magnetically permeable material portion is split along the axis by at least two flux decoupling gaps parallel to at least one of the central top plate and the central bottom plate.

14. The system according to claim 11, wherein each of the pair of central magnetically permeable material portions is split along the axis by at least one flux decoupling gap parallel to at least one of the central top plate and the central bottom plate.

15. The system according to claim 11, wherein each of the first auxiliary magnetically permeable material portion, the second auxiliary magnetically permeable material portion, and the pair of central magnetically permeable material portions is split along the axis by a plurality of flux decoupling gaps parallel to at least one of the lower plate and the upper plate, and each subcore has the same number of flux decoupling gaps parallel to at least one of the central top plate and the central bottom plate.

16. The system according to claim 10, wherein:

the first auxiliary subcore, the central subcore, and the second auxiliary subcore are configured with a respective flux decoupling gap between the first auxiliary subcore and the central subcore, and the central core and the second auxiliary subcore, so that magnetic flux linking adjacent subcores is decoupled;

the first auxiliary subcore and the second auxiliary subcore have different designs;

the second auxiliary subcore is configured to provide a desired value of a secondary-side inductance; and the center subcore is configured to carry a main flux to meet a magnetizing inductance to transfer power between the first side to the second side.

17. The system according to claim 10, wherein:

the first flux decoupling gap separating the first auxiliary subcore and the central subcore is an air gap configured to decouple a magnetic flux therebetween; and the second flux decoupling gap separating the second auxiliary subcore and the central subcore is an air gap configured to decouple a magnetic flux therebetween.

18. The system according to claim 10, wherein the primary coil and the secondary coil are each a planar coil.

19. The system according to claim 10, wherein at least a size, shape, and flux decoupling gap configuration of the first auxiliary subcore, the central subcore, and the second auxiliary subcore are optimized to meet at least a defined magnetizing inductance, a defined primary side resonant inductance, a defined secondary side resonant inductance, and a required power transfer capability.

20. The system according to claim 10, wherein:

the first auxiliary subcore defines a first magnetically coupled path;

the second auxiliary subcore defines a second magnetically coupled path;

the central subcore defines a third magnetically coupled path;

the first magnetically coupled path, the second magnetically coupled path, and the third magnetically coupled path being sufficiently spaced to be respectively magnetically decoupled;

the primary coil is a planar primary coil, surrounding the magnetically permeable portion of the first auxiliary subcore and one of the first set of segmented magnetically permeable spacers and the third set of magnetically permeable segmented spacers, such that a magnetizing flux is induced in the third set of magnetically permeable segmented spacers to meet a magnetizing inductance of the multicore transformer and a first leakage flux is induced in the first set of magnetically permeable segmented spacers to provide a reluctance path to a flow of leakage flux to achieve a primary side resonant inductance; and the secondary coil is a planar secondary coil, surrounding the second set of segmented magnetically permeable spacers and the fourth set of magnetically permeable segmented spacers, such that the magnetizing flux in the fourth set of magnetically permeable segmented spacers is coupled to the planar secondary coil, and a second leakage flux is induced in the second set of magnetically permeable segmented spacers to provide a reluctance path to a flow of leakage flux to achieve a secondary side resonant inductance.

* * * * *